US007684220B2

(12) United States Patent
Fang et al.

(10) Patent No.: US 7,684,220 B2
(45) Date of Patent: Mar. 23, 2010

(54) SYSTEM AND METHOD PROVIDING OVER CURRENT AND OVER POWER PROTECTION FOR POWER CONVERTER

(75) Inventors: Lieyi Fang, Shanghai (CN); Shifeng Zhao, Shanghai (CN); Bo Li, Shanghai (CN); Zhiliang Chen, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 462 days.

(21) Appl. No.: 11/752,926

(22) Filed: May 24, 2007

(65) Prior Publication Data

US 2007/0279820 A1 Dec. 6, 2007

Related U.S. Application Data

(63) Continuation-in-part of application No. 11/213,657, filed on Aug. 26, 2005, now Pat. No. 7,394,634.

(30) Foreign Application Priority Data

Apr. 28, 2007 (CN) .......................... 2007 1 0040379

(51) Int. Cl.
*H02H 7/122* (2006.01)
(52) U.S. Cl. .................... 363/56.1; 361/93.2
(58) Field of Classification Search .............. 363/50, 363/55, 56.01, 56.03, 56.07, 56.1; 361/93.1, 361/93.2, 93.7, 93.9
See application file for complete search history.

(56) References Cited

U.S. PATENT DOCUMENTS

| 6,611,439 | B1 | 8/2003 | Yang et al. |
| 6,839,247 | B1 | 1/2005 | Yang et al. |
| 6,842,350 | B2 * | 1/2005 | Yamada et al. ........... 363/21.16 |
| 6,903,536 | B2 | 6/2005 | Yang |
| 6,954,367 | B2 | 10/2005 | Yang et al. |
| 7,061,225 | B2 | 6/2006 | Yang et al. |
| 2002/0131279 | A1 * | 9/2002 | Tang ........................ 363/21.12 |
| 2003/0156433 | A1 * | 8/2003 | Gong et al. ................... 363/18 |

FOREIGN PATENT DOCUMENTS

CN 1448005 A 10/2003

\* cited by examiner

*Primary Examiner*—Adolf Berhane
*Assistant Examiner*—Matthew Grubb
(74) *Attorney, Agent, or Firm*—Jones Day

(57) ABSTRACT

System and method for protecting a power converter. A system includes a threshold generator configured to generate a threshold signal, and a first comparator configured to receive the threshold signal and a first signal and to generate a comparison signal. The first signal is associated with an input current for a power converter. Additionally, the system includes a pulse-width-modulation generator configured to receive the comparison signal and generate a modulation signal in response to the comparison signal, and a switch configured to receive the modulation signal and adjust the input current for the power converter. The threshold signal is associated with a threshold magnitude as a function of time. The threshold magnitude increases with time at a first slope during a first period, and the threshold magnitude increases with time at a second slope during a second period. The first slope and the second slope are different.

32 Claims, 18 Drawing Sheets

(A)

(B)

SYSTEM AND METHOD PROVIDING OVER CURRENT AND OVER POWER PROTECTION FOR POWER CONVERTER

CROSS-REFERENCES TO RELATED APPLICATIONS

This application claims priority to Chinese Patent Application No. 200710040379.9, filed Apr. 28, 2007, commonly assigned, incorporated by reference herein for all purposes. Additionally, this application is a continuation-in-part of U.S. patent application Ser. No. 11/213,657, filed Aug. 26, 2005, commonly assigned, incorporated by reference herein for all purposes.

This application is related to U.S. patent application Ser. No. 11/051,242, commonly assigned, incorporated by reference herein for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to integrated circuits. More particularly, the invention provides a control system and method for over-current protection and over-power protection. Merely by way of example, the invention has been applied to a power converter. But it would be recognized that the invention has a much broader range of applicability.

Power converters are widely used for consumer electronics such as portable devices. The power converters can convert electric power from one form to another form. As an example, the electric power is transformed from alternate current (AC) to direct current (DC), from DC to AC, from AC to AC, or from DC to DC. Additionally, the power converters can convert the electric power from one voltage level to another voltage level.

The power converters include linear converters and switch-mode converters. The switch-mode converters often use pulse-width-modulated (PWM) or pulse-frequency-modulated mechanisms. These mechanisms are usually implemented with a switch-mode controller including various protection components. These components can provide over-voltage protection, over-temperature protection, over-current protection (OCP), and over-power protection (OPP). These protections can often prevent the power converters and connected circuitries from suffering permanent damage.

For example, a power converter includes a power switch and transformer winding that is in series with the power switch. The current flowing through the power switch and transformer winding may be limited by an OCP system. If the OCP system is not effective, the current can reach a level at which damage to the power switch is imminent due to excessive current and voltage stress at switching or thermal run-away during operation. For example, this current level can be reached when the output short circuit or over loading occurs. Consequently, the rectifier components on the transformer secondary side are subject to permanent damage due to excessive voltage and current stress in many offline flyback converters. Hence an effective OCP system is important for a reliable switch mode converter.

FIG. 1 is a simplified conventional switch mode converter with over-current protection. A switch mode converter 100 includes an OCP comparator 110, a PWM controller component 120, a gate driver 130, a power switch 140, resistors 150, 152, 154, and 156, and a primary winding 160. For example, the OCP comparator 110, the PWM controller component 120, and the gate driver 130 are parts of a chip 180 for PWM control. When the current of the primary winding is greater than a limiting level, the PWM controller component 120 turns off the power switch 140 and shuts down the switch mode power converter 100.

For switch mode converter, a cycle-by-cycle or pulse-by-pulse control mechanism is often used for OCP. For example, the cycle-by-cycle control scheme limits the maximum current and thus the maximum power delivered by the switch mode converter. This limitation on maximum power can protect the power converter from thermal run-away. Some conventional OCP systems use an adjustable OCP threshold value based on line input voltage, but the actual limitation on maximum current and thus maximum power is not always constant over a wide range of line input voltage. Other conventional OCP systems use additional resistors 152 and 154 that are external to the chip 180 and inserted between $V_{in}$ and the resistor 150 as shown in FIG. 1. But the resistor 152 consumes significant power, which often is undesirable for meeting stringent requirements on low standby power. For example, the resistor 152 of 2 MΩ can dissipate about 70 mW with input AC voltage of 264 volts.

Hence it is highly desirable to improve techniques for over-current protection and over-power protection.

BRIEF SUMMARY OF THE INVENTION

The present invention is directed to integrated circuits. More particularly, the invention provides a control system and method for over-current protection and over-power protection. Merely by way of example, the invention has been applied to a power converter. But it would be recognized that the invention has a much broader range of applicability.

According to one embodiment of the present invention, a system for protecting a power converter is provided. The system includes a first comparator configured to receive a threshold signal and a first signal and to generate a comparison signal. The first signal is a sum of a second signal and a third signal, and the third signal is associated with an input current for a power converter. Additionally, the system includes a pulse-width-modulation generator configured to receive the comparison signal and generate a modulation signal in response to the comparison signal, and a switch configured to receive the modulation signal and control the input current for the power converter. An amplitude for the first signal becomes larger if an amplitude for the input voltage becomes larger. The second signal is generated by receiving an input voltage for the power converter, converting the received input voltage to a fourth signal, and converting the fourth signal to the second signal.

According to another embodiment, a system for protecting a power converter includes a first comparator configured to receive a first signal and a second signal and to generate a comparison signal. The first signal is associated with an input current for a power converter. Additionally, the system includes a threshold generator configured to receive at least a third signal and generate the second signal in response to at least the third signal. The third signal is associated with an input voltage for the power converter. Moreover, the system includes a pulse-width-modulation generator configured to receive the comparison signal and generate a modulation signal in response to the comparison signal, and a switch configured to receive the modulation signal and control the input current for the power converter. An amplitude for the second signal becomes smaller if an amplitude for the input voltage becomes larger, and the third signal is generated by receiving an input voltage for the power converter and converting the received input voltage to the third signal.

According to yet another embodiment, a system for protecting a power converter includes a first comparator configured to receive a threshold signal and a first signal and to generate a comparison signal. The first signal is equal to a second signal subtracted by a third signal, and the second signal is associated with an input current for a power converter. Additionally, the system includes a pulse-width-modulation generator configured to receive the comparison signal and generate a modulation signal in response to the comparison signal, and a switch configured to receive the modulation signal and control the input current for the power converter. Moreover, the system includes an oscillator coupled to the pulse-width-modulation generator and configured to generate at least a first control signal, a transconductor configured to receive the first control signal and generate a second control signal, and a current supplier configured to receive the second control signal and generate a first current in response to the second control signal, the first current being associated with the third signal. An amplitude for the first current becomes smaller if an amplitude for the input voltage becomes larger.

According to yet another embodiment, a method for protecting a power converter includes receiving an input voltage for a power converter, converting the received input voltage to a first signal, converting the first signal to a second signal, and generating a third signal based on at least information associated with the second signal. Additionally, the method includes receiving the third signal and a threshold signal. The third signal is a sum of the second signal and a fourth signal, and the fourth signal is associated with an input current for the power converter. Moreover, the method includes generating a comparison signal based on at least information associated with the third signal and the threshold signal, and processing information associated with the comparison signal. Also, the method includes generating a modulation signal based on at least information associated with the comparison signal, and controlling the input current for the power converter in response to the modulation signal. An amplitude for the third signal becomes larger if an amplitude for the input voltage becomes larger.

According to yet another embodiment, a method for protecting a power converter includes receiving an input voltage for a power converter, converting the received input voltage to a first signal, processing information associated with the first signal, generating a second signal based on at least information associated with the first signal, and receiving the second signal and a third signal. The third signal is associated with an input current for a power converter. Additionally, the method includes generating a comparison signal based on at least information associated with the second signal and the third signal, processing information associated with the comparison signal, generating a modulation signal based on at least information associated with the comparison signal, and controlling the input current for the power converter in response to the modulation signal. An amplitude for the second signal becomes smaller if an amplitude for the input voltage becomes larger.

According to yet another embodiment, a method for protecting a power converter includes generating a first signal based on at least information associated with an input current for a power converter, generating a second signal, the second signal being proportional to a ramping current, and processing information associated with the first signal and the second signal. Additionally, the method includes generating a third signal equal to the first signal subtracted by the second signal, receiving the third signal and a threshold signal, generating a comparison signal based on at least information associated with the third signal and the threshold signal, processing information associated with the comparison signal, generating a modulation signal based on at least information associated with the comparison signal, and controlling the input current for the power converter in response to the modulation signal. An amplitude for the ramping current corresponding to a predetermined value for the input current becomes smaller if an amplitude for the input voltage becomes larger.

Many benefits are achieved by way of the present invention over conventional techniques. For example, some embodiments can provide an excellent compensation for the "delay to output" by easily adjusting an external resistor. For example, the adjustment of the external resistor takes into account converter components external to a chip for PWM control. Certain embodiments allow a maximum current and a maximum power that are constant over a wide range of input voltage. Some embodiments consume a low standby power by sharing a resistor for a sensing system with a startup system and/or a brownout protection system. For example, the resistor is shared by a sensing system and a startup system. Certain embodiments provide an excellent compensation for the "delay to output" without sensing an input voltage. For example, the pin counts for a chip for PWM control is limited. In another example, the maximum width of a PWM signal is used to represent the input voltage. Different input voltages result in different maximum widths for the PWM signal, and the different maximum widths result in different effective threshold signals. Some embodiments provide an over-current protection that can effectively protect a power converter from excessive power, thermal run away, excessive current and/or voltage stress.

According to yet another embodiment, a system for protecting a power converter includes a threshold generator configured to generate a threshold signal, and a first comparator configured to receive the threshold signal and a first signal and to generate a comparison signal. The first signal is associated with an input current for a power converter. Additionally, the system includes a pulse-width-modulation generator configured to receive the comparison signal and generate a modulation signal in response to the comparison signal, and a switch configured to receive the modulation signal and adjust the input current for the power converter. The threshold signal is associated with a threshold magnitude as a function of time. The threshold magnitude increases with time at a first slope during a first period, and the threshold magnitude increases with time at a second slope during a second period. The first slope and the second slope are different.

According to yet another embodiment, a system for protecting a power converter includes a threshold generator configured to generate a first threshold signal, and a first comparator configured to receive the first threshold signal and a first input signal and to generate a first comparison signal. The first input signal is associated with an input current for a power converter, and the first threshold signal is associated with a first threshold magnitude as a function of time. Additionally, the system includes a second comparator configured to receive a second threshold signal and the first input signal and to generate a second comparison signal. The second threshold signal is associated with a second threshold magnitude. Moreover, the system includes a logic component configured to receive the first comparison signal and the second comparison signal and generate an output signal. Also, the system includes a pulse-width-modulation generator configured to receive the output signal and to generate a modulation signal in response to the output signal, and a switch configured to receive the modulation signal and adjust the input current for the power converter. The first threshold magnitude increases with time at a first slope during a first period, and the first threshold magnitude increases with time at a second slope during at least a second period. The first slope and the second slope are different.

According to yet another embodiment, a system for protecting a power converter includes a current generator configured to generate a first current flowing into the current generator, and a comparator configured to receive a threshold signal and a first signal and to generate a comparison signal. The first signal is a sum of a second signal and a third signal, the second signal is associated with the first current, and the third signal is associated with an input current for a power converter. Additionally, the system includes a pulse-width-modulation generator configured to receive the comparison signal and generate a modulation signal in response to the comparison signal, and a switch configured to receive the modulation signal and adjust the input current for the power converter. The first current is associated with a current magnitude as a function of time. The current magnitude increases with time at a first slope during a first period, and the threshold magnitude increases with time at a second slope during a second period. The first slope and the second slope are different.

According to yet another embodiment, a method for protecting a power converter includes generating a threshold signal, and receiving the threshold signal and a first signal. The first signal is associated with an input current for a power converter. Additionally, the method includes processing information associated with the threshold signal and the first signal, generating a comparison signal based on at least information associated with the threshold signal and the first signal, processing information associated with the comparison signal, generating a modulation signal based on at least information associate with the comparison signal, and adjusting the input current for the power converter in response to the modulation signal. The threshold signal is associated with a threshold magnitude as a function of time. The threshold magnitude increases with time at a first slope during a first period, and the threshold magnitude increases with time at a second slope during a second period. The first slope and the second slope are different.

According to yet another embodiment, a method for protecting a power converter includes generating a first threshold signal. The first threshold signal is associated with a first threshold magnitude as a function of time. Additionally, the method includes receiving the first threshold signal and a first input signal. The first input signal is associated with an input current for a power converter. Moreover, the method includes processing information associated with the first threshold signal and the first input signal, generating a first comparison signal based on at least information associated with the first threshold signal and the first input signal, and receiving a second threshold signal and the first input signal. The second threshold signal is associated with a second threshold magnitude. Also, the method includes processing information associated with the second threshold signal and the first input signal, generating a second comparison signal based on at least information associated with the second threshold signal and the first input signal, receiving the first comparison signal and the second comparison signal, and generating an output signal based on at least information associated with the first comparison signal and the second comparison signal. Additionally, the method includes processing information associated with the output signal, generating a modulation signal based on at least information associated with the output signal, and adjust the input current for the power converter in response to the modulation signal. The first threshold magnitude increases with time at a first slope during a first period, the first threshold magnitude increases with time at a second slope during at least a second period, and the first slope and the second slope are different.

According to yet another embodiment, a method for protecting a power converter includes generating a first current flowing into a current generator, and receiving a threshold signal and a first signal. The first signal is a sum of a second signal and a third signal, the second signal is associated with the first current, and the third signal is associated with an input current for a power converter. Additionally, the method includes processing information associated with the threshold signal and the first signal, generating a comparison signal based on at least information associated with the threshold signal and the first signal, processing information associated with the comparison signal, generating a modulation signal based on at least information associated with the comparison signal, and adjusting the input current for the power converter in response to the modulation signal. The first current is associated with a current magnitude as a function of time. The current magnitude increases with time at a first slope during a first period, and the threshold magnitude increases with time at a second slope during a second period. The first slope and the second slope are different.

Various additional objects, features and advantages of the present invention can be more fully appreciated with reference to the detailed description and the accompanying drawings that follow.

DETAILED DESCRIPTION OF THE INVENTION

The present invention is directed to integrated circuits. More particularly, the invention provides a control system and method for over-current protection and over-power protection. Merely by way of example, the invention has been applied to a power converter. But it would be recognized that the invention has a much broader range of applicability.

Figure 1:
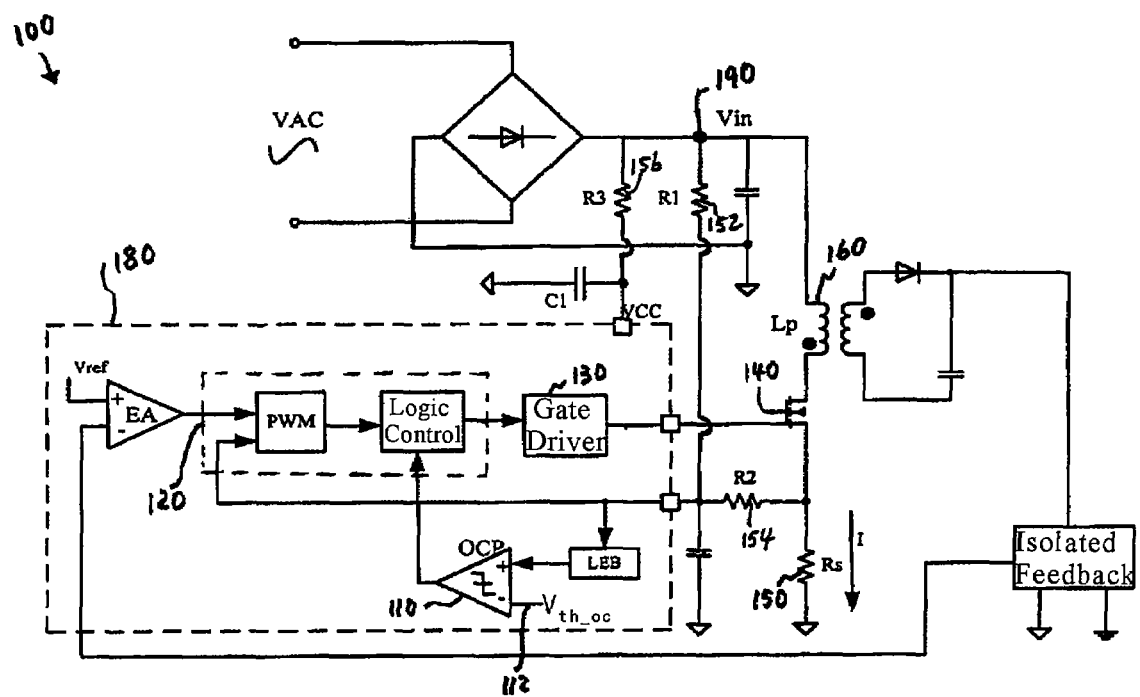
FIG. 1 is a simplified conventional switch mode converter with over-current protection.

As shown in FIG. 1, the current limit is expressed as follows:

$$I_{Limit} = \frac{V_{in}}{L_p} \times t_{on} = \frac{V_{th\_oc}}{R_s} \quad \text{(Equation 1)}$$

where $I_{Limit}$ represents the current limit. For example, the current limit is the current threshold for triggering over-current protection. Additionally, $V_{in}$ is the input line voltage at node 190, and $V_{th\_oc}$ is the voltage level at an input terminal 112 of the OCP comparator 110. $R_s$ is the resistance of the resistor 150, and $L_p$ is the inductance of the primary winding 160. Moreover, $t_{on}$ represents on time of the power switch 140 for each cycle. Accordingly, the maximum energy $\epsilon$ stored in the primary winding 160 is $$\varepsilon = \frac{1}{2} \times L_p \times I_{Limit}^2 = PT \quad \text{(Equation 2)}$$

where T represents the clock period, and P represents the maximum power. So the maximum power P can be expressed as follows:

$$P = \frac{L_p \times I_{Limit}^2}{2T} = \frac{V_{in} \times t_{on}^2}{2 \times L_p \times T} \quad \text{(Equation 3)}$$

Figure 2:
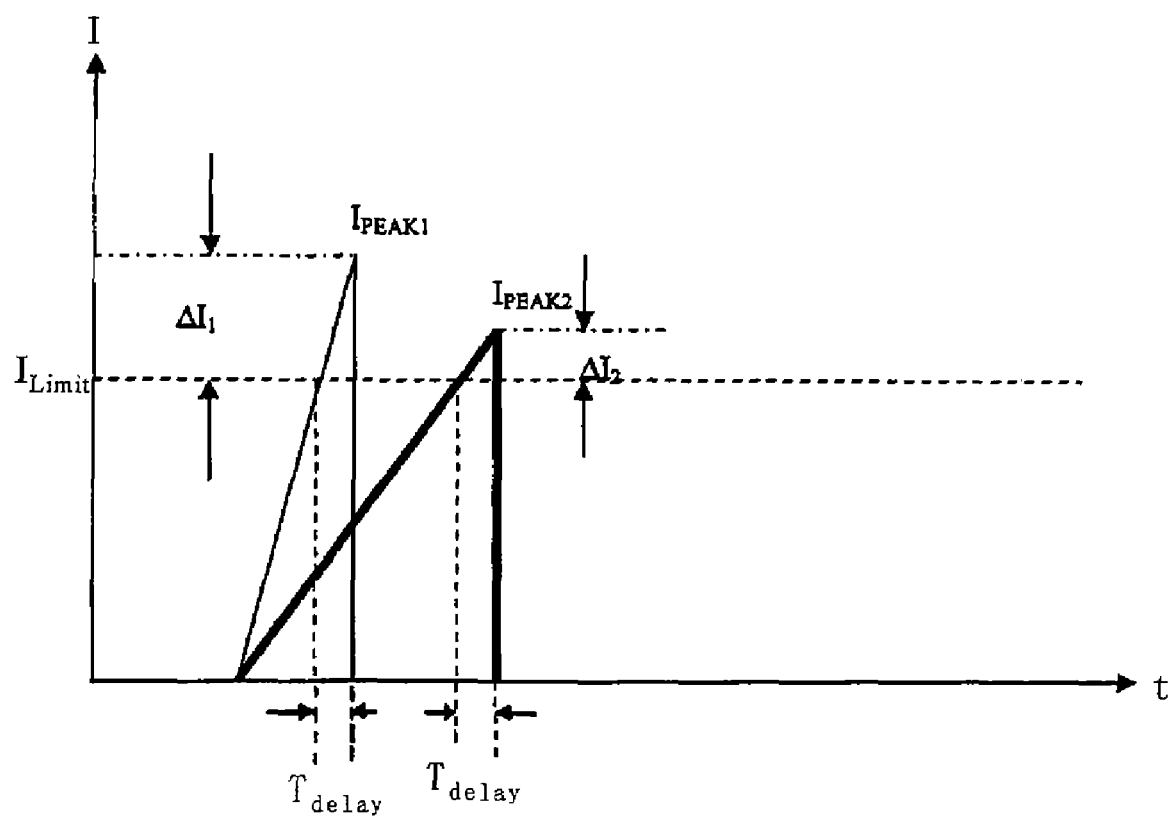
FIG. 2 is a simplified diagram showing relationship between extra current ramping amplitude and line input voltage.

Therefore the power can be limited by controlling the current limit $I_{Limit}$. But Equation 3 does not take into account the "delay to output" that includes the propagation delay through a current sense path to the power switch 140. For example, the propagation delay includes propagation delays through the OCP comparator 110, the PWM controller component 120, the gate driver 130, and the response delay of turning off of the power switch 140. During the "delay to output," the power switch 140 remains on, and the input current through the switch 140 keeps ramping up despite the current has already reached the threshold level of the OCP comparator 110. The extra current ramping amplitude, $\Delta I$, due the "delay to output" is proportional to the line input voltage $V_{in}$ as follows:

$$\Delta I = \frac{V_{in}}{L_p} \times T_{delay} \quad \text{(Equation 4)}$$

where $T_{delay}$ represents the "delay to output." FIG. 2 is a simplified diagram showing relationship between extra current ramping amplitude and line input voltage. As shown in FIG. 2, the actual maximum current $I_{PEAK1}$ that corresponds to higher $V_{in}$ is larger than the actual maximum current $I_{PEAK2}$ that corresponds to lower $V_{in}$. Accordingly, the actual maximum power is not constant over a wide range of line input voltage. Hence the actual maximum power is expressed as follows:

$$P = \frac{L_p \times (I_{Limit} + \Delta I)^2}{2T} = \frac{V_{in} \times (t_{on} + T_{delay})^2}{2 \times L_p \times T} \quad \text{(Equation 5)}$$

For example, $T_{delay}$ depends on internal delays, gate charges, and circuitry related to the gate driver 130. In another example, for the predetermined switch mode converter 100, $T_{delay}$ is constant, and hence the actual maximum power depends on the line input voltage. To compensate for variations of the actual maximum power, the threshold for over-current protection should be adjusted based on the input line voltage.

Figure 3:
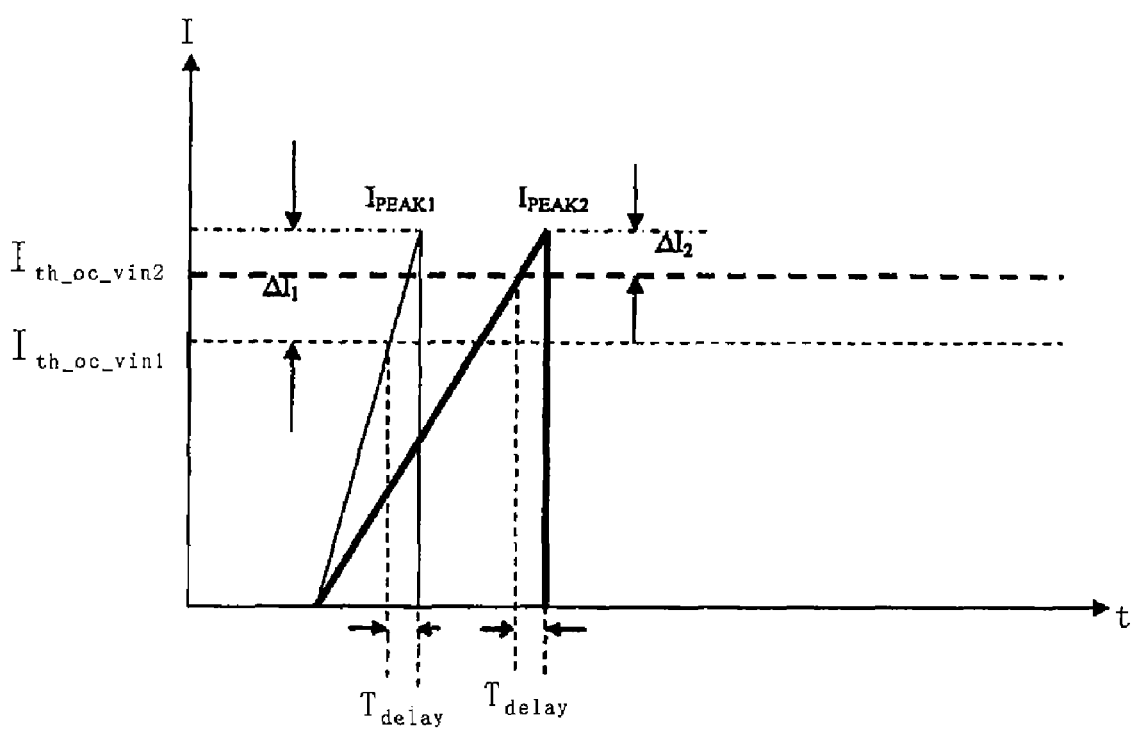
FIG. 3 is a simplified diagram showing relationship between current threshold and line input voltage.

FIG. 3 is a simplified diagram showing relationship between current threshold and line input voltage. The line input voltage $V_{in2}$ is lower than the line input voltage $V_{in1}$, and the current threshold $I_{th\_oc\_vin2}$ for $V_{in2}$ is larger than $I_{th\_oc\_vin1}$ for $V_{in1}$ as shown in FIG. 3. The current threshold decreases with increasing line input voltage $V_{in}$. At the current threshold, the over-current protection is triggered. The resulting maximum current $I_{PEAK1}$ for higher $V_{in}$ is the same as the resulting maximum current $I_{PEAK2}$ for lower $V_{in}$.

For example, the current threshold has the following relationship with the line input voltage:

$$I_{th\_oc} \approx I_{th\_oc}(V_{in1}) - \frac{V_{in} - V_{in1}}{L_p} T_{delay} \quad \text{(Equation 6)}$$

where $I_{th\_oc}$ is the current threshold, $V_{in}$ is the line input voltage, $L_p$ is the inductance of the primary winding, and $T_{delay}$ is the "delay to output." Additionally, $I_{th\_oc}(V_{in1})$ is the current threshold that is predetermined for the input line voltage $V_{in1}$. For example, $V_{in1}$ is the minimum line input voltage. In another example, the current is sensed that flows through the power switch and the primary winding. If the sensed current reaches $I_{th\_oc}$, the PWM controller component sends a signal to turn off the power switch. After "delay to output," the power switch is turned off.

Figure 4:
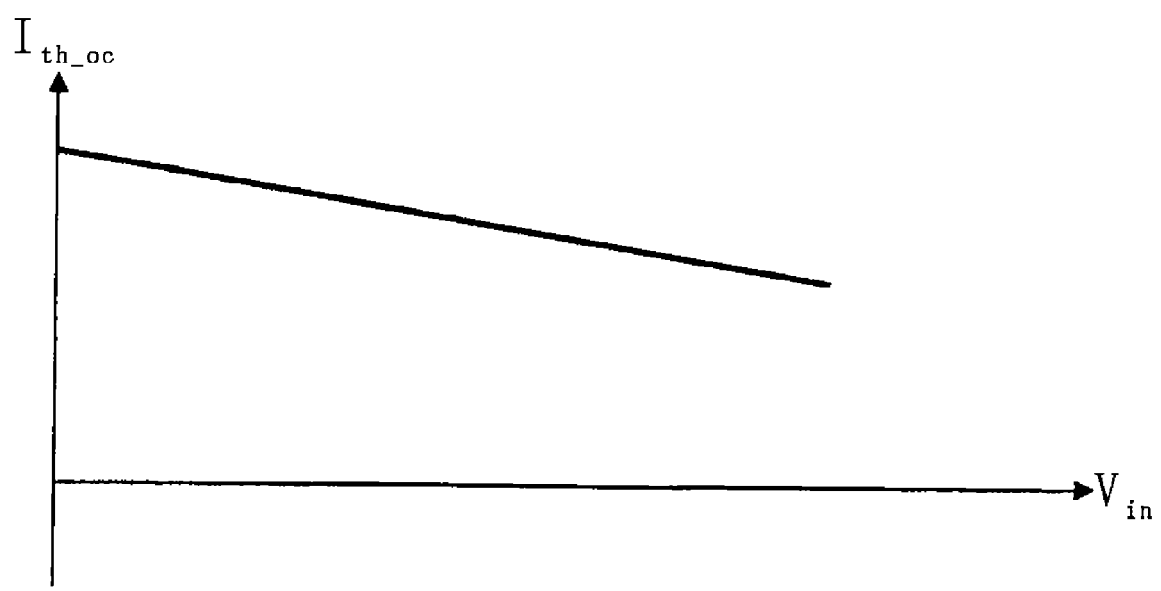
FIG. 4 is a simplified diagram showing relationship between threshold offset and line input voltage.

In Equation 6, the second term $$\frac{V_{in} - V_{in1}}{L_p} T_{delay}$$

represents a threshold offset to compensate for the effects of "delay to output." FIG. 4 is a simplified diagram showing relationship between threshold offset and line input voltage. As shown in FIG. 4, the term $$\frac{T_{delay}}{L_p}$$

is the slop that depends on the "delay to output" and the inductance of primary winding. As shown in FIG. 4, the current threshold decreases with increasing line input voltage.

For certain applications, it is difficult to estimate the threshold offset on chip for PWM control in order to compensate for the "delay to output." For example, $T_{delay}$ depends on converter components that are internal and as well as external to the chip. The external components may include a power MOSFET. Different types of power MOSFETs can have different gate charges, which in turn result in different "delays to output." Also, the external components may include the primary winding. Different types of primary windings can have different inductance values. In another example, the gate driver on the chip is intentionally made slow for longer $T_{delay}$.

Certain embodiments of the present invention provide systems and methods that allow maximum currents that are constant over wide range of input voltage. For example, these systems and methods are implemented in switch mode converters. In another example, the input voltage is the input line voltage for power converters.

In some embodiments, the input voltage is sensed and used to control a current source. The current source outputs a current that is used to generate an offset signal through an adjustable resistor. For example, the adjustable resistor is external to a chip for PWM control. The offset signal is superimposed on a current sensing signal, and this superimposition provides a threshold offset to a predetermined current threshold as shown in Equation 6.

These embodiments of the present invention include examples of FIGS. 5 through 9. FIGS. 5-9 are simplified control systems with constant maximum current according to certain embodiments of the present invention. These diagrams are merely examples, which should not unduly limit the scope of the claims. One of ordinary skill in the art would recognize many variations, alternatives, and modifications.

Figure 5:
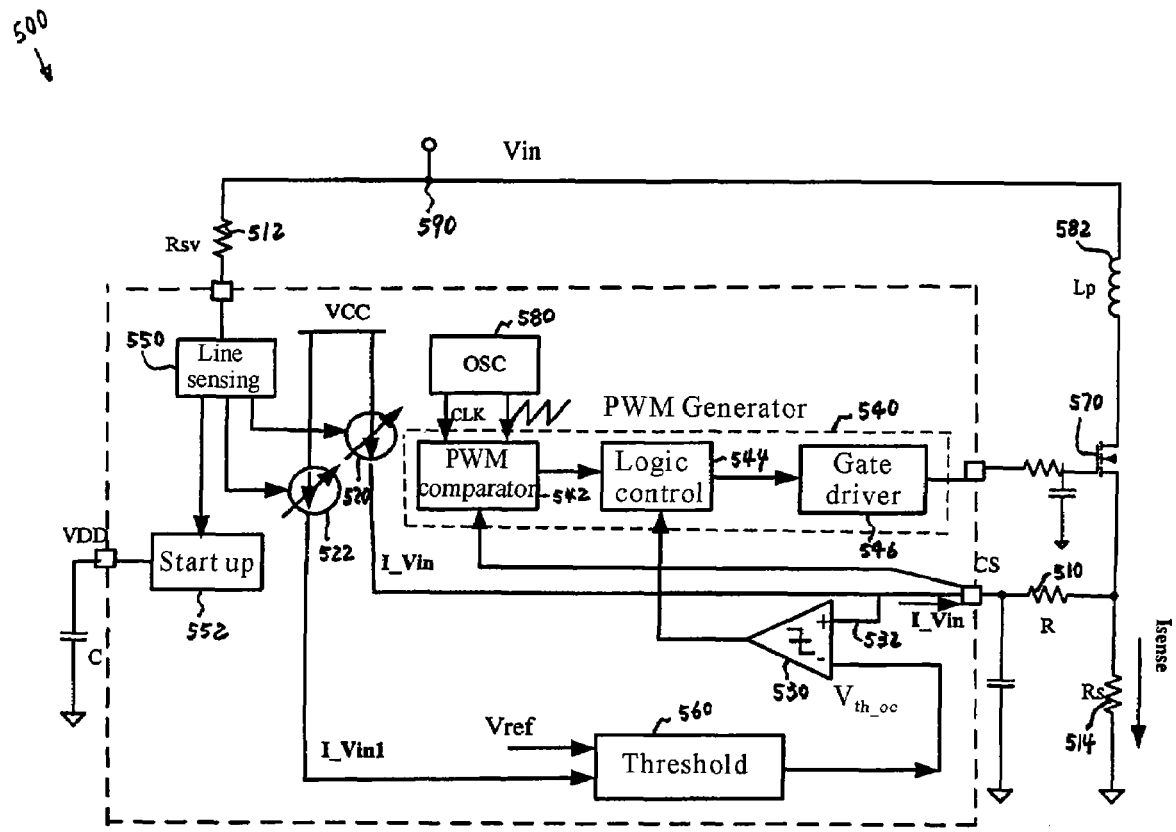
FIG. 5 is a simplified control system with constant maximum current according to an embodiment of the present invention.
Figure 6:
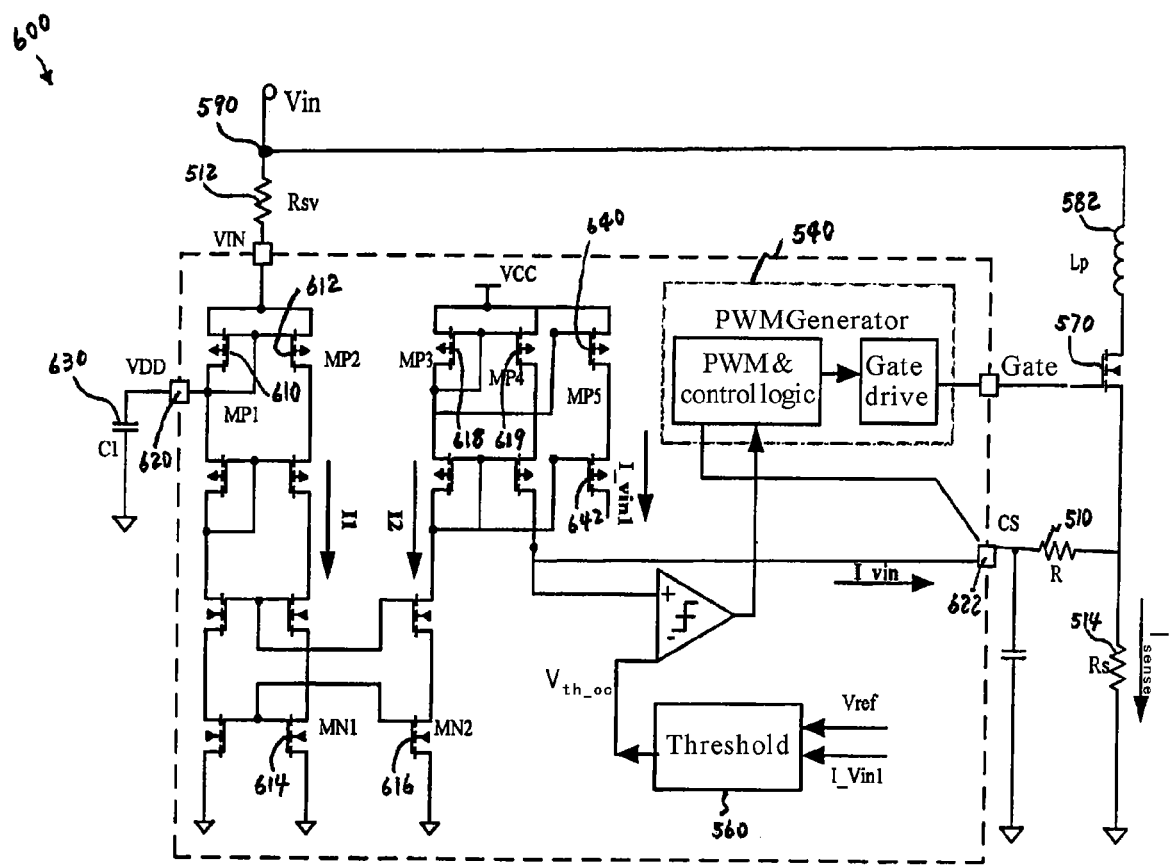
FIG. 6 is a simplified control system with constant maximum current according to an embodiment of the present invention.
Figure 7:
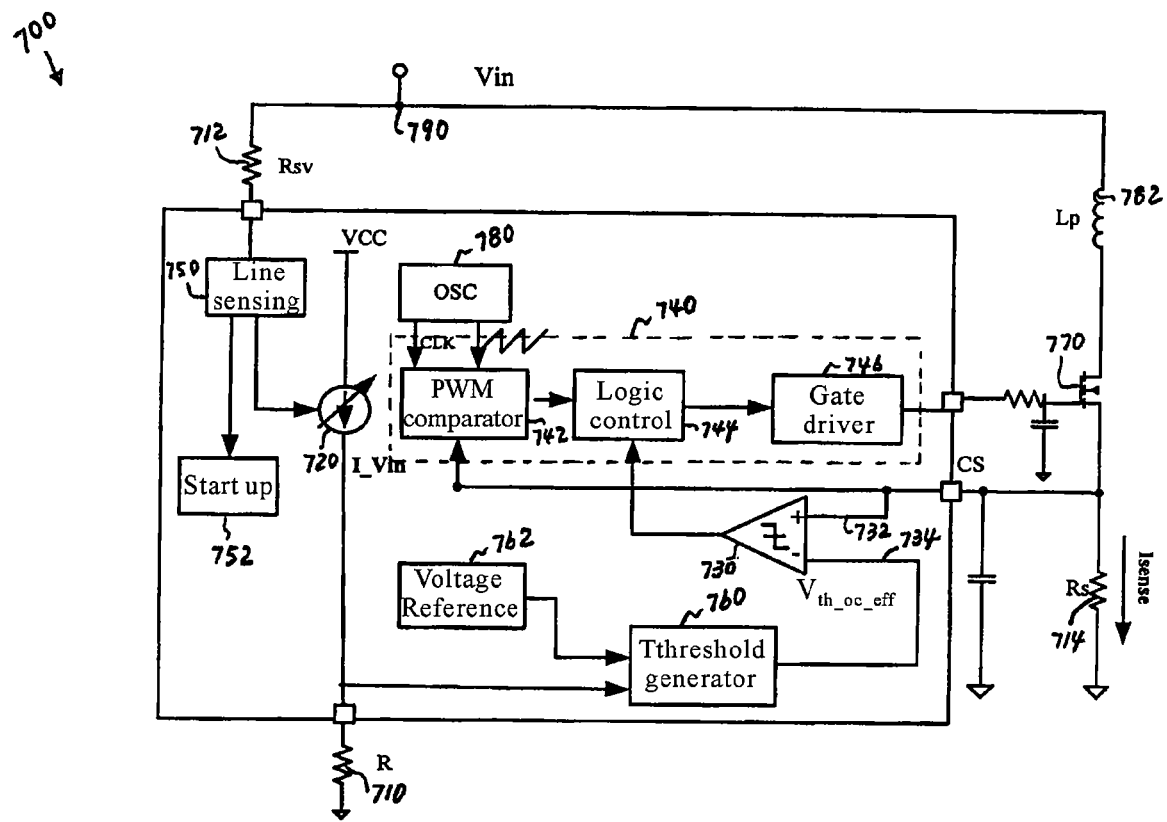
FIG. 7 is a simplified control system with constant maximum current according to another embodiment of the present invention.

As shown in FIGS. 5-7, an input voltage $V_{in}$ is sensed and used to control a current source. The current source generates a current $I_{\_vin}$ as follows:

$$I_{\_vin} = \alpha \frac{V_{in}}{R_{sv}} \quad \text{(Equation 7)}$$

where $\alpha$ is a constant. The current $I_{\_vin}$ is used to generate an offset signal through an adjustable resistor R. For FIGS. 5 and 6, the offset signal is superimposed to a current sensing signal. Accordingly, an input signal to a comparator is the summation of sensed signal $I_{sense} \times R_s$ and the offset signal $I_{\_vin} \times R$. If the input signal reaches the threshold signal $V_{th\_oc}$, a gate driver is commanded to turn off a power switch. Accordingly, when the over-current protection is triggered, $$I_{sense} \times R_s + I_{\_vin} \times R = V_{th\_oc} \quad \text{(Equation 8A)}$$

The effective threshold signal $I_{th\_oc}$ is $$I_{th\_oc} = \frac{I_{sense}}{R_s} \quad \text{(Equation 9)}$$

$$\text{Therefore, } I_{th\_oc} = \frac{V_{th\_oc}}{R_s} - \frac{I_{\_vin} \times R}{R_s} \quad \text{(Equation 10)}$$

$$= \frac{V_{th\_oc}}{R_s} - \frac{\alpha \times Vin \times R}{R_s \times R_{sv}}$$

From Equations 6 and 10, the following relationship can be derived:

$$I_{th\_oc}(V_{in1}) = \frac{V_{th\_oc}}{R_s} - \frac{V_{in1}}{L_p} T_{delay} \text{ and} \quad \text{(Equation 11)}$$

$$\frac{V_{in}}{L_p} T_{delay} = \frac{\alpha \times V_{in} \times R}{R_s \times R_{sv}} \quad \text{(Equation 12)}$$

$$\text{According } R = \frac{R_s \times R_{sv}}{\alpha L_p} T_{delay} \quad \text{(Equation 13)}$$

Hence the effects of "delay to output" can be compensated by adjusting the resistor R for given $L_p$, $R_{sv}$, and $R_s$ in a switching mode converter.

For FIG. 7, the offset signal is subtracted from the threshold signal to generate an effective threshold signal $V_{th\_oc\_eff}$. The effective threshold signal is provided to a comparator. Another input of the comparator receives the sensed signal $I_{sense} \times R_s$. If the sensed signal reaches the effective threshold signal $V_{th\_oc\_eff}$, a gate driver is commanded to turn off a power switch. Accordingly, when the over-current protection is triggered, $$I_{sense} \times R_s = V_{th\_oc\_eff} = V_{th\_oc} - I_{\_vin} \times R \quad \text{(Equation 8B)}$$

Therefore, Equations 9-13 are still valid. The effects of "delay to output" can be compensated by adjusting the resistor R for given $L_p$, $R_{sv}$, and $R_s$ in a switching mode converter.

FIG. 5 is a simplified control system with constant maximum current according to an embodiment of the present invention. This diagram is merely an example, which should not unduly limit the scope of the claims. One of ordinary skill in the art would recognize many variations, alternatives, and modifications. A system 500 includes resistors 510, 512, and 514, current suppliers 520 and 522, a startup system 552, a comparator 530, a pulse-width-modulation (PWM) generator 540, a sensing system 550, a threshold generator 560, and a switch 570. Although the above has been shown using a selected group of components for the system 500, there can be many alternatives, modifications, and variations. For example, some of the components may be expanded and/or combined. Other components may be inserted to those noted above. For example, the system 500 includes an oscillator 580, which sends a clock signal and a ramping signal to the PWM generator 540. In another example, the system 500 includes a primary winding 582 with an inductance value of $L_p$. Depending upon the embodiment, the arrangement of components may be interchanged with others replaced. For example, the system 500 is used to regulate a power converter. Further details of these components are found throughout the present specification and more particularly below.

For example, an input voltage $V_{in}$ at node 590 is sensed by the sensing system 550 through the resistor 512 of $R_{sv}$. In one embodiment, the resistor 512 has a resistance value ranging from several hundred kilo-ohms to several mega-ohms. In another embodiment, the sensing system 550 sends a signal to the current supplier 520. For example, the current supplier 520 is a current source. The current supplier 520 generates a current $I_{\_vin}$ flowing through the resistor 510 of R and generating an offset signal. The offset signal is superimposed to a current sensing signal. For example, the current sensing signal is generated by the resistor 514 of $R_s$. The summation of the offset signal and the current sensing signal is provided to an input 532 of the comparator 530. For example, the summation is in the voltage domain. At the comparator 530, the summation is compared with a predetermined threshold signal generated by the threshold generator 560. For example, the threshold generator 560 receives a current $I_{\_vin1}$ and a reference voltage $V_{ref}$. Based on the comparison, the comparator 530 sends a signal to the PWM generator 540. For example, the PWM generator 540 includes a PWM comparator 542, a logic controller 544, and a gate driver 546. The logic controller receives the signal sent from the comparator 530. In another example, the PWM comparator 542 receives the clock signal and the ramping signal generated by the oscillator 580. The PWM generator 540 receives the signal from the comparator 530 and controls the switch 570 through the gate driver 546. Additionally, the sensing system 550 sends a signal to the current supplier 522 according to an embodiment of the present invention. For example, the current supplier 522 is a current source. The current supplier 522 generates the current $I_{\_vin1}$ received by the threshold generator 560. The effects of "delay to output" can be compensated by adjusting the resistor R. For example, the system 500 allows a maximum current that is constant over a wide range of the input voltage $V_{in}$. In another example, the resistor 510 is adjusted for given $L_p$, $R_{sv}$, and $R_s$ in a switching mode converter according to Equation 13. In yet another example, the startup system 552 is connected to the sensing system 550, and is used to control powering up of a chip for PWM control.

FIG. 6 is a simplified control system with constant maximum current according to an embodiment of the present invention. This diagram is merely an example, which should not unduly limit the scope of the claims. One of ordinary skill in the art would recognize many variations, alternatives, and modifications. A system 600 is an example of the system 500. As shown in FIG. 6, the input voltage $V_{in}$ at the node 590 is converted by the resistor 512 of $R_{sv}$ into a current. The current is sensed by a transistor 610 of MP1 through a voltage VDD at node 620. For example, the node 620 is connected to a capacitor 630 of C1, which is charged by the input voltage $V_{in}$ and used to start up the chip for PWM control. In another example, the current I sensed by the transistor 620 is $$I = \frac{V_{in} - VDD}{R_{sv}} \approx \frac{V_{in}}{R_{sv}} \quad \text{(Equation 14)}$$

where VDD is negligible in comparison with $V_{in}$. Therefore the sensed current I is a function of the input voltage $V_{in}$. As shown in FIG. 6, the sensed current is mirrored by another transistor 612 of MP2 to generate another current I1. For example, the current mirror includes both the transistors 610 and 612. The current I1 is further mirrored by a transistor 614 of MN1 and a transistor 616 of MN2 to generate a current I2. The current I2 is mirrored by a transistor 618 of MP3 and a transistor 619 of MP4 to generate a current $I_{\_vin}$. For example, the cascade transistors are used to boost the output impedance of the current mirrors. In another example, the current $I_{\_vin}$ is proportional to the current I sensed by the transistor 620. The current $I_{\_vin}$ is used to generate the offset signal through the resistor 510 of R. The offset signal is superimposed to the current sensing signal. The generated signal $V_{cs}$ at node 622 is $$V_{cs} = I_{sense} \times R_s + I_{\_vin} \times R \quad \text{(Equation 15)}$$

As shown in FIG. 6, the signal $V_{cs}$ is provided to an input 532 of the comparator 530. At the comparator 530, the signal $V_{cs}$ is compared with a predetermined threshold signal generated by the threshold generator 560. In response, the comparator 530 sends a signal to the PWM generator 540, which controls the switch 570. Additionally, transistors 640 and 642 generate the current $I_{\_vin1}$, which is received by the threshold generator 560.

FIG. 7 is a simplified control system with constant maximum current according to another embodiment of the present invention. This diagram is merely an example, which should not unduly limit the scope of the claims. One of ordinary skill in the art would recognize many variations, alternatives, and modifications. A system 700 includes resistors 710, 712, and 714, a current supplier 720, a startup system 752, a comparator 730, a pulse-width-modulation (PWM) generator 740, a sensing system 750, a threshold generator 760, and a switch 770. Although the above has been shown using a selected group of components for the system 700, there can be many alternatives, modifications, and variations. For example, some of the components may be expanded and/or combined. Other components may be inserted to those noted above. For example, the system 700 includes an oscillator 780, which sends a clock signal and a ramping signal to the PWM generator 740. In another example, the system 700 includes a primary winding 782 with an inductance value of $L_p$. In yet another embodiment, the system 700 includes a signal generator 762 for providing a voltage reference signal. Depending upon the embodiment, the arrangement of components may be interchanged with others replaced. For example, the system 700 is used to regulate a power converter. Further details of these components are found throughout the present specification and more particularly below.

For example, an input voltage $V_{in}$ at node 790 is sensed by the sensing system 750 through the resistor 712 of $R_{sv}$. In one embodiment, the resistor 712 has a resistance value ranging from several hundred kilo-ohms to several mega-ohms. In another embodiment, the sensing system 750 receives a signal from the startup system 752, and sends a signal to the current supplier 720. For example, the startup system 752 is connected to the input voltage $V_{in}$ through the resistor 712, and is used to control powering up of a chip for PWM control. In another example, the current supplier is a current source. The current supplier generates a current $I_{\_vin}$ flowing through the resistor 710 of R and generating an offset signal. For example, the offset signal is an offset voltage. The offset signal is provided to the threshold generator 760, which also receives a voltage reference signal from the signal generator 762. The threshold generator 760 provides an effective threshold signal $V_{th\_oc\_eff}$ to an input 734 of the comparator 730. Additionally, a current sensing signal is received by an input 732 of the comparator 730. For example, the current sensing signal is generated by the resistor 714 of $R_s$. In another example, the current sensing signal is in the voltage domain.

At the comparator 730, the current sensing signal is compared with the effective threshold signal $V_{th\_oc\_eff}$. Based on the comparison, the comparator 730 sends a signal to the PWM generator 740. For example, the PWM generator 740 includes a PWM comparator 742, a logic controller 744, and a gate driver 746. The logic controller receives the signal sent from the comparator 730. In another example, the PWM comparator 742 receives the clock signal and the ramping signal generated by the oscillator 780. The PWM generator 740 receives the signal from the comparator 730 and controls the switch 770 through the gate driver 746. The effects of "delay to output" can be compensated by adjusting the resistor R. For example, the system 700 allows a maximum current that is constant over a wide range of the input voltage $V_{in}$. In another example, the resistor R is adjusted for given $L_p$, $R_{sv}$, and $R_s$ in a switching mode converter according to Equation 13.

Figure 8:
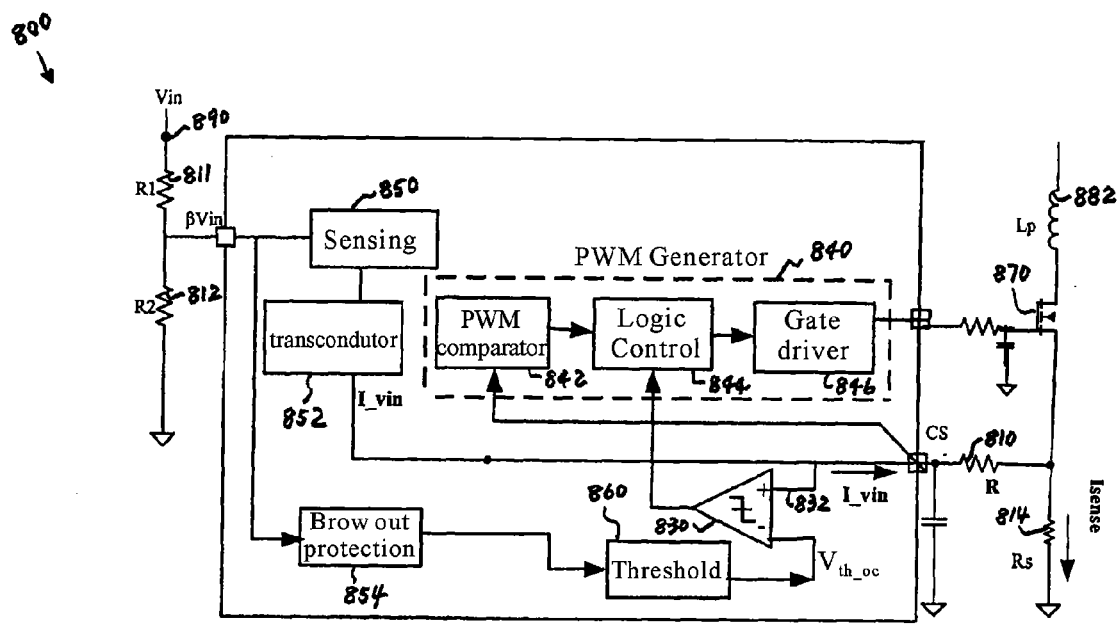
FIG. 8 is a simplified control system with constant maximum current according to yet another embodiment of the present invention.
Figure 9:
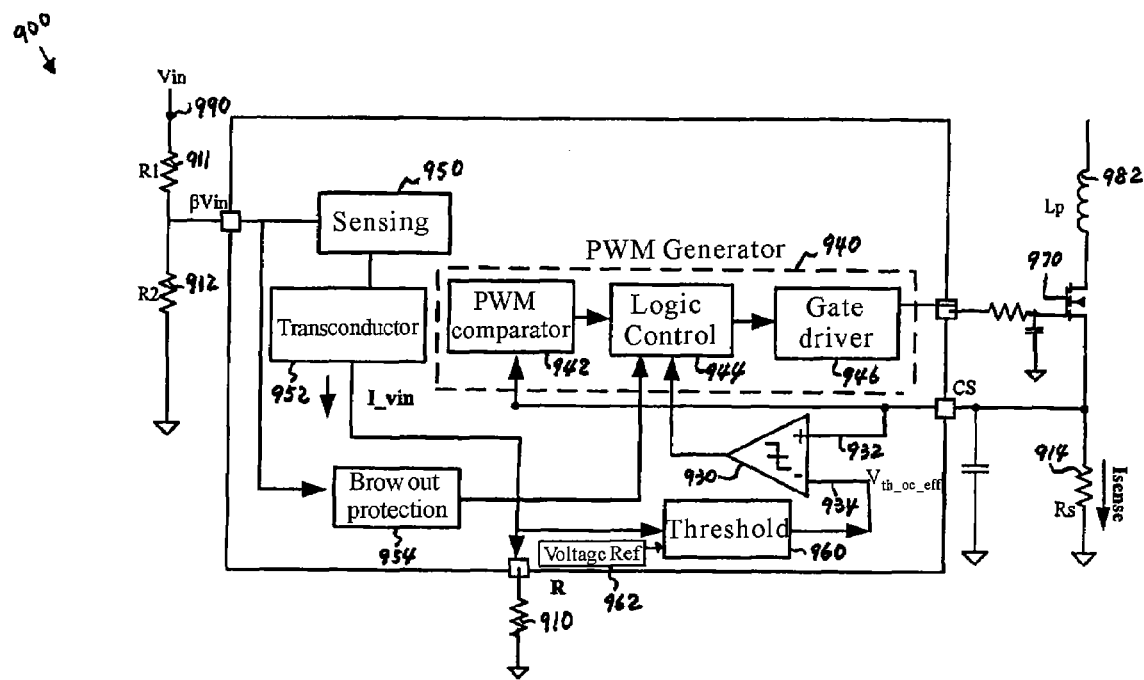
FIG. 9 is a simplified control system with constant maximum current according to yet another embodiment of the present invention.

According to other embodiments of the present invention, an input voltage $V_{in}$ is sensed and used to control a current source as shown in FIGS. 8 and 9. The current source generates a current $I_{\_vin}$ as follows:

$$\text{or } I_{\_vin} = \beta V_{in} \quad \text{(Equation 14)}$$

where β is a constant. The current $I_{\_vin}$ is used to generate an offset signal through an adjustable resistor R. For FIG. 8, the offset signal is superimposed to a current sensing signal. Accordingly, an input signal to a comparator is the summation of sensed signal $I_{sense} \times R_s$ and the offset signal $I_{\_vin} \times R$. If the input signal reaches the threshold signal $V_{th\_oc}$, a gate driver is commanded to turn off a power switch. Accordingly, when the over-current protection is triggered, $$I_{sense} \times R_s + I_{\_vin} \times R = V_{th\_oc} \quad \text{(Equation 15A)}$$

The effective threshold signal $I_{th\_oc}$ is $$I_{th\_oc} = \frac{I_{sense}}{R_s} \quad \text{(Equation 16)}$$

$$\text{Therefore, } I_{th\_oc} = \frac{V_{th\_oc}}{R_s} - \frac{I_{\_vin} \times R}{R_s} \quad \text{(Equation 17)}$$

$$= \frac{V_{th\_oc}}{R_s} - \frac{\beta \times V_{in} \times R}{R_s}$$

From Equations 6 and 17, the following relationship can be derived:

$$I_{th\_oc}(V_{in1}) = \frac{V_{th\_oc}}{R_s} - \frac{V_{in1}}{L_p} T_{delay} \quad \text{and} \quad \text{(Equation 18)}$$

$$\frac{V_{in}}{L_p} T_{delay} = \frac{\beta \times V_{in} \times R}{R_s} \quad \text{(Equation 19)}$$

$$\text{According } R = \frac{R_s}{\beta L_p} T_{delay} \quad \text{(Equation 20)}$$

Hence the effects of "delay to output" can be compensated by adjusting the resistor R for given $L_p$ and $R_s$ in a switching mode converter.

For FIG. 9, the offset signal is subtracted from the threshold signal to generate an effective threshold signal $V_{th\_oc\_eff}$. The effective threshold signal is provided to a comparator. Another input of the comparator receives the sensed signal $I_{sense} \times R_s$. If the sensed signal reaches the effective threshold signal $V_{th\_oc\_eff}$, a gate driver is commanded to turn off a power switch. Accordingly, when the over-current protection is triggered, $$I_{sense} \times R_s = V_{th\_oc\_eff} = V_{th\_oc} - I_{\_vin} \times R \quad \text{(Equation 15B)}$$

Therefore, Equations 16-20 are still valid. The effects of "delay to output" can be compensated by adjusting the resistor R for given $L_p$ and $R_s$ in a switching mode converter.

FIG. 8 is a simplified control system with constant maximum current according to yet another embodiment of the present invention. This diagram is merely an example, which should not unduly limit the scope of the claims. One of ordinary skill in the art would recognize many variations, alternatives, and modifications. A system 800 includes resistors 810, 811, 812, and 814, a comparator 830, a pulse-width-modulation (PWM) generator 840, a sensing system 850, a transconductor 852, a threshold generator 860, and a switch 870. Although the above has been shown using a selected group of components for the system 800, there can be many alternatives, modifications, and variations. For example, some of the components may be expanded and/or combined. Other components may be inserted to those noted above. For example, the system 800 includes an oscillator, which sends a clock signal and a ramping signal to the PWM generator 840. In another example, the system 800 includes a primary winding 882 with an inductance value of $L_p$. In yet another example, the system 800 includes a brownout protection system 854. Depending upon the embodiment, the arrangement of components may be interchanged with others replaced. For example, the system 800 is used to regulate a power converter. Further details of these components are found throughout the present specification and more particularly below.

For example, an input voltage $V_{in}$ at node 890 is received by a voltage divider to generate a voltage $\beta V_{in}$. For example, the voltage divider includes the resistors 811 and 812, which are external to the chip for PWM control. The voltage $\beta V_{in}$ is received by the sensing system 850 to generate a voltage signal. The voltage signal is sent to the transconductor 852, which generates a current $I_{\_vin}$ flowing through the resistor 810 of R and generating an offset signal. For example, the transconductor 852 is a voltage-controlled current source. The offset signal is superimposed to a current sensing signal. For example, the current sensing signal is generated by the resistor 814 of $R_s$. The summation of the offset signal and the current sensing signal is provided to an input 832 of the comparator 830. For example, the summation is in the voltage domain. At the comparator 830, the summation is compared with a predetermined threshold signal generated by the threshold generator 860. Based on the comparison, the comparator 830 sends a signal to the PWM generator 840. For example, the PWM generator 840 includes a PWM comparator 842, a logic controller 844, and a gate driver 846. The logic controller receives the signal sent from the comparator 830. In another example, the PWM comparator 842 receives the clock signal and the ramping signal generated by the oscillator. The PWM generator 840 receives the signal from the comparator 830 and controls the switch 870 through the gate driver 846. The effects of "delay to output" can be compensated by adjusting the resistor R. For example, the system 800 allows a maximum current that is constant over a wide range of the input voltage $V_{in}$. In another example, the resistor 810 is adjusted for given $L_p$ and $R_s$ in a switching mode converter according to Equation 20. In yet another example, the brownout protection system 854 receives the voltage $\beta V_{in}$, and is used to protect a switch-mode converter if an input voltage falls below a predetermined value.

FIG. 9 is a simplified control system with constant maximum current according to yet another embodiment of the present invention. This diagram is merely an example, which should not unduly limit the scope of the claims. One of ordinary skill in the art would recognize many variations, alternatives, and modifications. A system 900 includes resistors 910, 911, 912, and 914, a comparator 930, a pulse-width-modulation (PWM) generator 940, a sensing system 950, a transconductor 952, a threshold generator 960, and a switch 970. Although the above has been shown using a selected group of components for the system 900, there can be many alternatives, modifications, and variations. For example, some of the components may be expanded and/or combined. Other components may be inserted to those noted above. For example, the system 900 includes an oscillator, which sends a clock signal and a ramping signal to the PWM generator 940. In another example, the system 900 includes a primary winding 982 with an inductance value of $L_p$. In yet another example, the system 900 includes a brownout protection system 954. In yet another embodiment, the system 900 includes a signal generator 962 for providing a voltage reference signal. Depending upon the embodiment, the arrangement of components may be interchanged with others replaced. For example, the system 900 is used to regulate a power converter. Further details of these components are found throughout the present specification and more particularly below.

For example, an input voltage $V_{in}$ at node 990 is received by a voltage divider to generate a voltage $\beta V_{in}$. For example, the voltage divider includes the resistors 911 and 912, which are external to the chip for PWM control. The voltage $\beta V_{in}$ is received by the sensing system 950 to generate a voltage signal. The voltage signal is sent to the transconductor 952, which generates a current $I_{\_vin}$ flowing through the resistor 910 of R and generating an offset signal. For example, the transconductor 852 is a voltage-controlled current source. In another example, the offset signal is an offset voltage. The offset signal is provided to the threshold generator 960, which also receives a voltage reference signal from the signal generator 962. The threshold generator 960 provides an effective threshold signal $V_{th\_oc\_eff}$ to an input 934 of the comparator 930. Additionally, a current sensing signal is received by an input 932 of the comparator 930. For example, the current sensing signal is generated by the resistor 914 of $R_s$. In another example, the current sensing signal is in the voltage domain.

At the comparator 930, the current sensing signal is compared with the effective threshold signal $V_{th\_oc\_eff}$. Based on the comparison, the comparator 930 sends a signal to the PWM generator 940. For example, the PWM generator 940 includes a PWM comparator 942, a logic controller 944, and a gate driver 946. The logic controller receives the signal sent from the comparator 930. In another example, the PWM comparator 942 receives the clock signal and the ramping signal generated by the oscillator. The PWM generator 940 receives the signal from the comparator 930 and controls the switch 970 through the gate driver 946. The effects of "delay to output" can be compensated by adjusting the resistor R. For example, the system 900 allows a maximum current that is constant over a wide range of the input voltage $V_{in}$. In another example, the resistor R is adjusted for given $L_p$ and $R_s$ in a switching mode converter according to Equation 20. In yet another example, the brownout protection system 954 receives the voltage $\beta V_{in}$, and is used to protect a switch-mode converter if an input voltage falls below a predetermined value.

Figure 10:
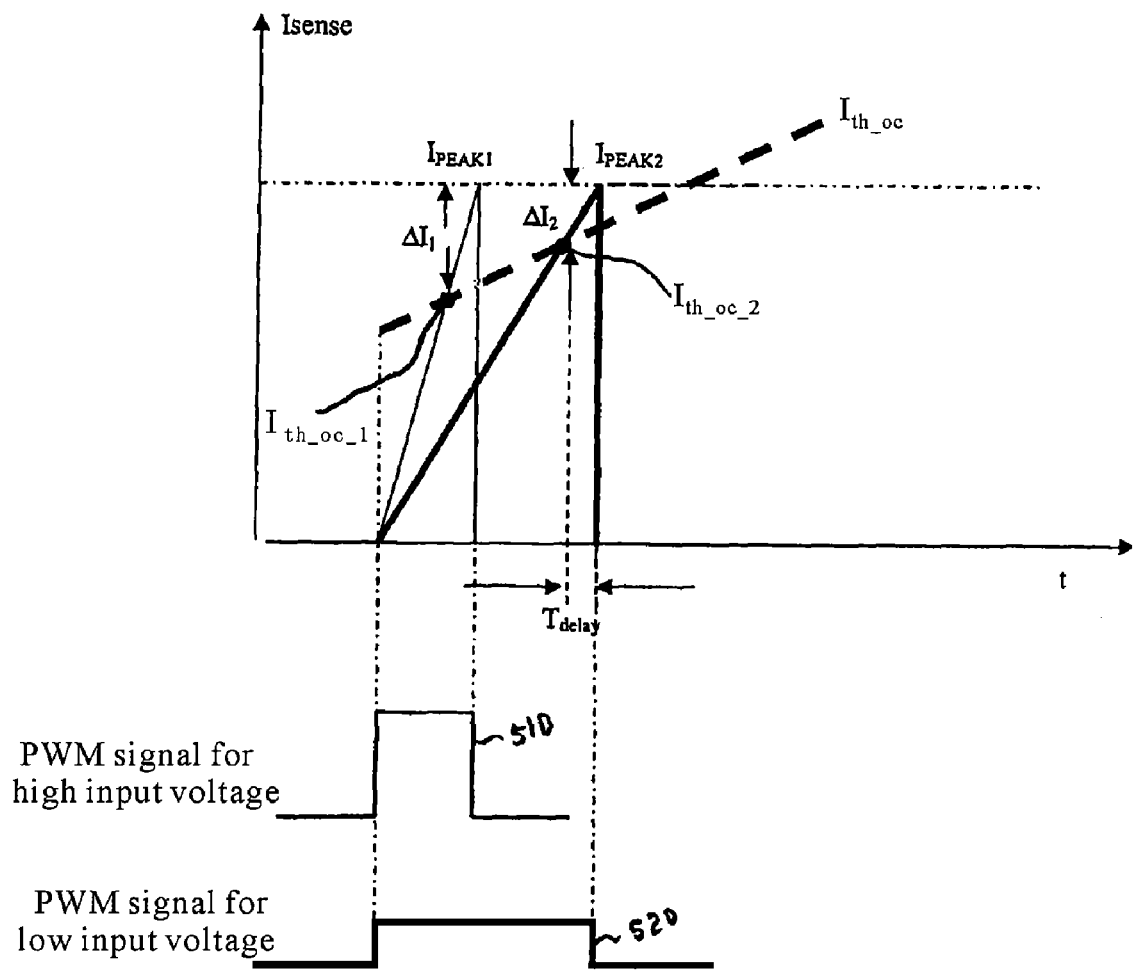
FIG. 10 is a simplified diagram showing relationship between PWM signal maximum width and input voltage according to an embodiment of the present invention.

According to other embodiments of the present invention, an input voltage is sensed based on the maximum width of PWM signal. For example, the PWM signal is applied to the gate of a power switch in series to the primary winding of a power converter. FIG. 10 is a simplified diagram showing relationship between PWM signal maximum width and input voltage according to an embodiment of the present invention. This diagram is merely an example, which should not unduly limit the scope of the claims. One of ordinary skill in the art would recognize many variations, alternatives, and modifications. As shown in FIG. 5, the maximum current is constant with respect to input voltage, and the maximum width of PWM signal varies with the input voltage. For example, the input voltage is the input line voltage for power converter. In another example, the maximum current $I_{PEAK1}$ equals the maximum current $I_{PEAK2}$. The maximum current $I_{PEAK1}$ corresponds to a higher input voltage and a PWM signal 510, and the maximum current $I_{PEAK2}$ corresponds to a lower input voltage and a PWM signal 520. As shown in FIG. 5, the maximum width for the PWM signal 510 is narrower for higher input voltage, and the maximum width for PWM signal 520 is wider for lower input voltage. The input voltage is represented by the maximum width of PWM signal if the maximum current is constant with respect to input voltage. Accordingly, the maximum width of PWM signal can be used to determine the threshold offset to compensate for the effects of "delay to output" as shown in Equation 6.

In one embodiment, the compensation can be realized by generating a current threshold, $I_{th\_oc}$, which is a function of the maximum width of PWM signal as shown in FIG. 10. For example, the current threshold is equal to $I_{th\_oc\_1}$ for the PWM signal 510 and $I_{th\_oc\_2}$ for the PWM signal 520. In another example, the slope of $I_{th\_oc}$ with respect to the maximum width is properly chosen to compensate for the effects of "delay to output" according to Equation 6. The selected slope takes into account information about power converter components that are external to the chip for PWM control. For example, the external components include the primary winding, a current sensing resistor and a power MOSFET. This embodiment of the present invention includes certain examples of FIG. 11.

Figure 11:
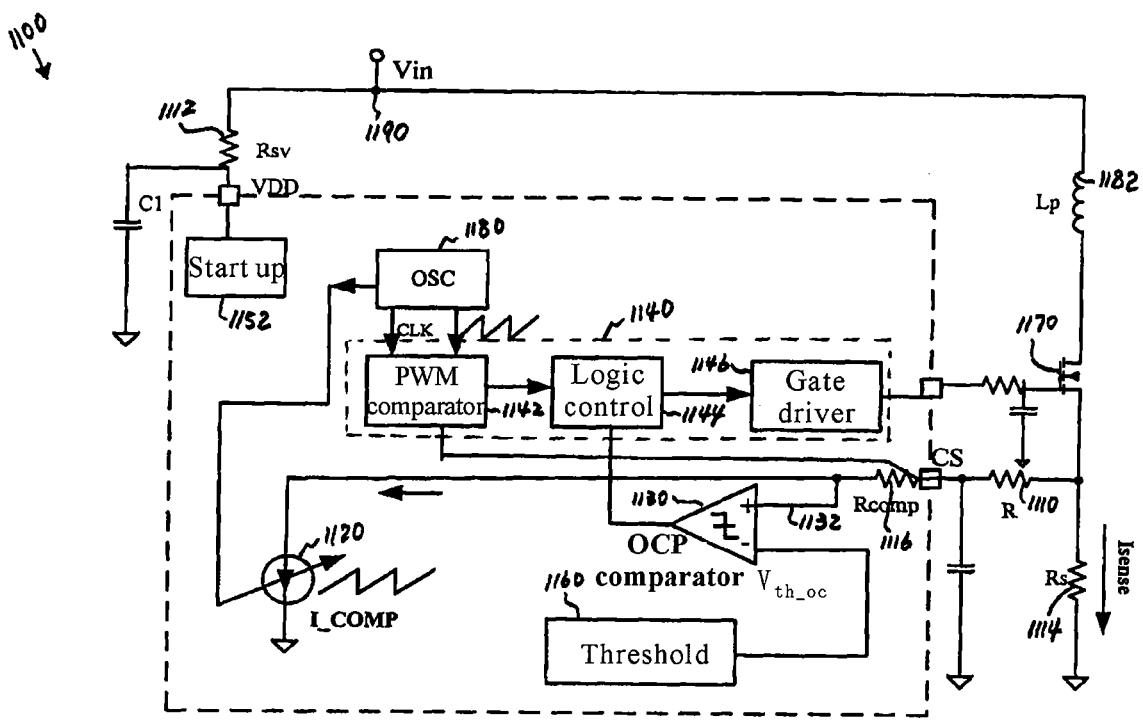
FIG. 11 is a simplified control system with constant maximum current according to yet another embodiment of the present invention.

FIG. 11 is a simplified control system with constant maximum current according to yet another embodiment of the present invention. This diagram is merely an example, which should not unduly limit the scope of the claims. One of ordinary skill in the art would recognize many variations, alternatives, and modifications. A system 1100 includes resistors 1110, 1112, 1114, and 1116, a current supplier 1120, a startup system 1152, a comparator 1130, a pulse-width-modulation (PWM) generator 1140, a threshold generator 1160, and a switch 1170. Although the above has been shown using a selected group of components for the system 1100, there can be many alternatives, modifications, and variations. For example, some of the components may be expanded and/or combined. Other components may be inserted to those noted above. For example, the system 1100 includes an oscillator 1180, which sends a clock signal and a ramping signal to the PWM generator 1140. In another example, the system 1100 includes a primary winding 1182 with an inductance value of $L_p$. Depending upon the embodiment, the arrangement of components may be interchanged with others replaced. For example, the system 1100 is used to regulate a power converter. In another example, the resistor 1116 of $R_{comp}$ is removed. Further details of these components are found throughout the present specification and more particularly below.

The current supplier 1120 is connected to the resistor 1116 of $R_{comp}$, and is used to generate a current $I_{\_comp}$. For example, the current supplier 1120 is a current sink. In another example, the current supplier 1120 includes a transconductor. In yet another example, the current $I_{\_comp}$ is a ramping current that is synchronized with a PWM signal. The current $I_{\_comp}$ flows through the resistor 1116 of $R_{comp}$ and the resistor 1110 of R and generates an offset signal. For example, the offset signal is in the voltage domain. The offset signal is subtracted from a current sensing signal to generate a composite signal. For example, the current sensing signal is generated by the resistor 1114 of $R_s$. The composite signal is provided to an input 1132 of the comparator 1130. For example, the composite signal is in the voltage domain and represented by $V_{com}$. At the comparator 1130, the composite signal is compared with a predetermined threshold signal generated by the threshold generator 1160. For example, the predetermined threshold signal is the threshold voltage $V_{th\_oc}$. Based on the comparison, the comparator 1130 sends a signal to the PWM generator 1140. For example, the PWM generator 1140 includes a PWM comparator 1142, a logic controller 1144, and a gate driver 1146. The logic controller receives the signal sent from the comparator 1130. In another example, the PWM comparator 1142 receives the clock signal and the ramping signal generated by the oscillator 1180. The PWM generator 1140 receives the signal from the comparator 1130 and controls the switch 1170 through the gate driver 1146. For example, the gate driver 1146 generates the PWM signal. The startup system 1152 is connected to the input voltage $V_{in}$ through the resistor 1112, and is used to control powering up of a chip for PWM control.

In one embodiment, the voltage $V_{com}$ at the input 1132 of the comparator 1130 is $$V_{com} = I_{sense} \times R_s - I_{\_comp} \times (R_{comp} + R) \quad \text{(Equation 21)}$$

The comparator 1130 sends a signal to the PWM generator 1140 for turning off the switch 1170 if $V_{com}$ reaches the threshold voltage $V_{th\_oc}$ as follows:

$$I_{sense} \times R_s - I_{\_comp} \times (R_{comp} + R) = V_{th\_oc} \quad \text{(Equation 22)}$$

$$\text{and } I_{sense} \times R_s = V_{th\_oc} + I_{\_comp} \times (R_{comp} + R) \quad \text{(Equation 23)}$$

The effective threshold signal $I_{th\_oc}$ is $$I_{th\_oc} = \frac{I_{sense}}{R_s} \quad \text{(Equation 24)}$$

$$\text{Therefore, } I_{th\_oc} = \frac{V_{th\_oc}}{R_s} + \frac{I_{\_comp} \times (R_{comp} + R)}{R_s} \quad \text{(Equation 25)}$$

where $I_{\_comp}$ is a ramping signal whose amplitude is synchronized with the PWM signal. Different maximum widths of the PWM signal results in different magnitudes for the second term in Equation 25. For example, the larger maximum width corresponds to lower input voltage, and the smaller maximum width corresponds to higher input voltage. Accordingly, the higher input voltage results in smaller $I_{th\_oc}$, and the lower input voltage results in larger $I_{th\_oc}$. In another example, the ramping signal $I_{\_comp}$ is described as follows:

$$I_{\_comp}(t) = \delta \times (t - nT) \quad \text{(Equation 26)}$$

$$\text{and } 0 \leq t \leq T_{on} \quad \text{(Equation 27)}$$

where δ is a constant, and $T_{on}$ is the maximum width of the PWM signal. For example, $T_{on}$ corresponds to a period during which the PWM signal turns on the switch 1170. In another example, a period of the PWM signal $T_{on}$ and $T_{off}$ during which the PWM signal turns off the switch 1170. In yet another example, $T_{on}$ depends on the input voltage and the maximum current, and is represented by $T_{\_vin}$ corresponding to the input voltage $V_{in}$.

Accordingly, at $t = T_{on}$ (Equation 28)

$$I_{th\_oc} = \frac{V_{th\_oc}}{R_s} + \frac{I_{\_comp} \times (R_{comp} + R)}{R_s} = \quad \text{(Equation 29)}$$

$$\frac{V_{th\_oc}}{R_s} + \frac{\delta \times T_{\_vin} \times (R_{comp} + R)}{R_s}$$

For example, $T_{\_vin}$ can be expressed as follows:

$$T_{\_vin} = \frac{V_{th\_oc} \times L_p}{V_{in} \times R_s} \quad \text{(Equation 30)}$$

$$\text{Hence } I_{th\_oc} = \frac{V_{th\_oc}}{R_s} + \frac{\delta \times (R_{comp} + R) \times V_{th\_oc} \times L_p}{V_{in} \times R_s \times R_s} \quad \text{(Equation 31)}$$

As shown in Equation 31, the second term on the right side is inversely proportional to $V_{in}$. The effective threshold is lower for higher input voltage and higher for lower input voltage. By adjusting the resistor 1110 of R, the effects of "delay to output" can be compensated. For example, the system 1100 allows a maximum current that is constant over a wide range of the input voltage $V_{in}$. In another example, the resistor 1110 is adjusted for given $L_p$ and $R_s$ in a switching mode converter according to Equation 31.

As discussed above and further emphasized here, Equations 1-31 are merely examples, which should not unduly limit the scope of the claims. One of ordinary skill in the art would recognize many variations, alternatives, and modifications. For example, Equations 7-31 are used to describe certain examples for FIGS. 5-9 and 11, but FIGS. 5-9 and 11 can operate according to methods that may be different from those of Equations 7-31.

According to another embodiment of the present invention, a programmable line-voltage-compensated current-limiting control system and a method thereof are provided. The line input voltage is sensed and received by an input-controlled current source. The current source generates a current that flows through an external resistor connecting between a current sensing terminal and a current sensing resistor R. The resulting offset voltage is proportional to the line input voltage, and is superimposed with a current sensing signal. The summation signal is provided to an over-current comparator to generate a control signal. The control signal can be used to turn off a power switch in a switching mode converter. For example, the system and the method are implemented according to the systems 500 and/or 600.

According to yet another embodiment of the present invention, a programmable line-voltage-compensated current-limiting control system and a method thereof are provided. The line input voltage is sensed and received by an input-controlled current source. The current source flows through an external resistor connecting between the current source and the ground. The resulting offset voltage is proportional to the line input voltage, and is superimposed with a reference signal to generate an effective threshold signal. The effective threshold signal is compared with a current sensing signal by an over-current comparator to generate a control signal. The control signal can be used to turn off a power switch in a switch mode converter. For example, the system and the method are implemented according to the system 700.

According to yet another embodiment of the present invention, a programmable line-voltage-compensated current-limiting control system and a method thereof are provided. The line input voltage is sensed by a resistor and sensing transistors connecting between the line voltage and a chip power supply terminal. As a result, a current is generated that is proportional to the line input voltage. The current is mirrored by a current mirror and/or a current amplifier to generate an input-controlled current. The input-controlled current flows through an external resistor to generate an offset signal. For example, the system and the method are implemented according to the systems 500, 600, and/or 700.

According to yet another embodiment of the present invention, a programmable line-voltage-compensated current-limiting control system and a method thereof are provided. The line input voltage is divided by a voltage divider. The divide voltage is sensed and converted to an input-controlled current by a transconductor. The input-controlled current flows through an external resistor connecting between a current sensing terminal and a current sensing resistor. The resulting offset voltage is proportional to the line input voltage, and is superimposed with a current sensing signal. The summation signal is provided to an over-current comparator to generate a control signal. The control signal can be used to turn off a power switch in a switch mode converter. For example, the system and the method are implemented according to the system 800.

According to yet another embodiment of the present invention, a programmable line-voltage-compensated current-limiting control system and a method thereof are provided. The line input voltage is divided by a voltage divider. The divide voltage is sensed and converted to an input-controlled current by a transconductor. The input-controlled current source flows through an external resistor connecting between the transconductor and the ground. The resulting offset voltage is proportional to the line input voltage, and is superimposed with a reference signal to generate an effective threshold signal. The effective threshold signal is compared with a current sensing signal by an over-current comparator to generate a control signal. This control signal can be used to turn off a power switch in a switch mode converter. For example, the system and the method are implemented according to the system 900.

According to yet another embodiment of the present invention, a programmable line-voltage-compensated current-limiting control system and a method thereof are provided. The line input voltage is divided by a voltage divider. The divided voltage is sensed and converted by a transconductor. As a result, a current is generated that is proportional to the line input voltage. The current is mirrored by a current mirror and/or a current amplifier to generate an input-controlled current. The input-controlled current flows through an external resistor to generate an offset signal. For example, the system and the method are implemented according to the systems 800 and/or 900.

According to yet another embodiment of the present invention, a programmable line-voltage-compensated current-limiting control system and a method thereof are provided. The line input voltage information is represented by the PWM width for constant current limiting. A PWM-synchronized current-ramping signal controls a current sink connected to a current sensing terminal of a chip. As a result, a current that flows through an external resistor into the chip and flows through an internal resistor in the chip is sunk by the current sink. Additionally, the current has a ramping magnitude that is synchronized with a PWM signal. The resulting offset voltage is subtracted from a current sensing signal to generate a composite signal. The composite signal is provided to an over-current comparator to generate a control signal. The control signal can be used to turn off a power switch in a switch mode converter. For example, the system and the method are implemented according to the system 1100.

According to yet another embodiment, a system for protecting a power converter includes a first comparator configured to receive a threshold signal and a first signal and to generate a comparison signal. The first signal is a sum of a second signal and a third signal, and the third signal is associated with an input current for a power converter. Additionally, the system includes a pulse-width-modulation generator configured to receive the comparison signal and generate a modulation signal in response to the comparison signal, and a switch configured to receive the modulation signal and control the input current for the power converter. An amplitude for the first signal becomes larger if an amplitude for the input voltage becomes larger. The second signal is generated by receiving an input voltage for the power converter, converting the received input voltage to a fourth signal, and converting the fourth signal to the second signal. For example, the system is implemented according to the systems 500, 600, and/or 800.

According to yet another embodiment, a system for protecting a power converter includes a first comparator configured to receive a first signal and a second signal and to generate a comparison signal. The first signal is associated with an input current for a power converter. Additionally, the system includes a threshold generator configured to receive at least a third signal and generate the second signal in response to at least the third signal. The third signal is associated with an input voltage for the power converter. Moreover, the system includes a pulse-width-modulation generator configured to receive the comparison signal and generate a modulation signal in response to the comparison signal, and a switch configured to receive the modulation signal and control the input current for the power converter. An amplitude for the second signal becomes smaller if an amplitude for the input voltage becomes larger, and the third signal is generated by receiving an input voltage for the power converter and converting the received input voltage to the third signal. For example, the system is implemented according to the systems 700 and/or 900.

According to yet another embodiment, a system for protecting a power converter includes a first comparator configured to receive a threshold signal and a first signal and to generate a comparison signal. The first signal is equal to a second signal subtracted by a third signal, and the second signal is associated with an input current for a power converter. Additionally, the system includes a pulse-width-modulation generator configured to receive the comparison signal and generate a modulation signal in response to the comparison signal, and a switch configured to receive the modulation signal and control the input current for the power converter. Moreover, the system includes an oscillator coupled to the pulse-width-modulation generator and configured to generate at least a first control signal, a transconductor configured to receive the first control signal and generate a second control signal, and a current supplier configured to receive the second control signal and generate a first current in response to the second control signal, the first current being associated with the third signal. An amplitude for the first current becomes smaller if an amplitude for the input voltage becomes larger. For example, the system is implemented according to the system 1100.

According to yet another embodiment, a method for protecting a power converter includes receiving an input voltage for a power converter, converting the received input voltage to a first signal, converting the first signal to a second signal, and generating a third signal based on at least information associated with the second signal. Additionally, the method includes receiving the third signal and a threshold signal. The third signal is a sum of the second signal and a fourth signal, and the fourth signal is associated with an input current for the power converter. Moreover, the method includes generating a comparison signal based on at least information associated with the third signal and the threshold signal, and processing information associated with the comparison signal. Also, the method includes generating a modulation signal based on at least information associated with the comparison signal, and controlling the input current for the power converter in response to the modulation signal. An amplitude for the third signal becomes larger if an amplitude for the input voltage becomes larger. For example, the method is implemented by the systems 500, 600, and/or 800.

According to yet another embodiment, a method for protecting a power converter includes receiving an input voltage for a power converter, converting the received input voltage to a first signal, processing information associated with the first signal, generating a second signal based on at least information associated with the first signal, and receiving the second signal and a third signal. The third signal is associated with an input current for a power converter. Additionally, the method includes generating a comparison signal based on at least information associated with the second signal and the third signal, processing information associated with the comparison signal, generating a modulation signal based on at least information associated with the comparison signal, and controlling the input current for the power converter in response to the modulation signal. An amplitude for the second signal becomes smaller if an amplitude for the input voltage becomes larger. For example, the method is implemented by the systems 700 and/or 900.

According to yet another embodiment, a method for protecting a power converter includes generating a first signal based on at least information associated with an input current for a power converter, generating a second signal, the second signal being proportional to a ramping current, and processing information associated with the first signal and the second signal. Additionally, the method includes generating a third signal equal to the first signal subtracted by the second signal, receiving the third signal and a threshold signal, generating a comparison signal based on at least information associated with the third signal and the threshold signal, processing information associated with the comparison signal, generating a modulation signal based on at least information associated with the comparison signal, and controlling the input current for the power converter in response to the modulation signal. An amplitude for the ramping current corresponding to a predetermined value for the input current becomes smaller if an amplitude for the input voltage becomes larger. For example, the method is implemented by the system 1100.

The present invention has various applications. In some embodiments, the systems of FIGS. 5-9 and/or 11 can be used to regulate switch-mode converters. For example, the switch-mode converters include offline flyback converters and/or forward converters. In other embodiments, the systems of FIGS. 5-9 and/or 11 allow a maximum power that is constant over a wide range of input voltage.

The present invention has various advantages. Some embodiments can provide an excellent compensation for the "delay to output" by easily adjusting an external resistor. For example, the adjustment of the external resistor takes into account converter components external to a chip for PWM control. Certain embodiments allow a maximum current and a maximum power that are constant over a wide range of input voltage. Some embodiments consume a low standby power by sharing a resistor for a sensing system with a startup system and/or a brownout protection system. For example, the resistor is shared by a sensing system and a startup system. Certain embodiments provide an excellent compensation for the "delay to output" without sensing an input voltage. For example, the pin counts for a chip for PWM control is limited. In another example, the maximum width of a PWM signal is used to represent the input voltage. Different input voltages result in different maximum widths for the PWM signal, and the different maximum widths result in different effective threshold signals. Some embodiments provide an over-current protection that can effectively protect a power converter from excessive power, thermal run away, excessive current and/or voltage stress.

Figure 12:
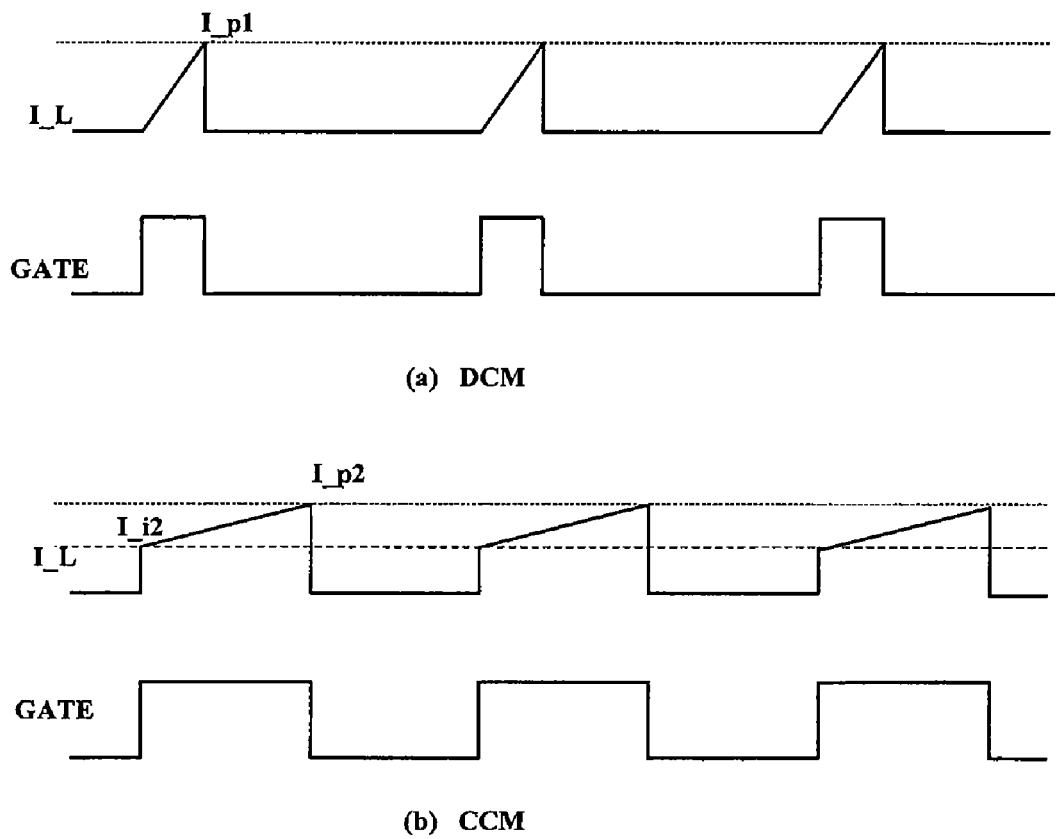
FIG. 12 shows simplified current profiles for primary winding in CCM mode and DCM mode.

To achieve high efficiency, a power converter usually works in CCM mode at low input line voltage and works in DCM mode at high input line voltage. FIG. 12 shows simplified current profiles for primary winding in CCM mode and DCM mode. The current profiles describe current magnitudes as functions of time. As shown in FIG. 12(*a*), the current for primary winding increases from I_L to a current limit I_p1 within a pulse width at each cycle in DCM mode. For example, I_L is equal to zero. The energy delivered to the load at each cycle is $$\varepsilon = \frac{1}{2} \times L_p \times (\text{I\_p1})^2 \qquad \text{(Equation 32)}$$

In contrast, as shown in FIG. 12(*b*), the current for primary winding increases from I_i2 to a current limit I_p2 within a pulse width at each cycle in CCM mode. For example, I_i2 is larger than zero. The energy delivered to the load at each cycle is $$\varepsilon = \frac{1}{2} \times L_p \times \left[(\text{I\_p2})^2 - (\text{I\_i2})^2\right] \qquad \text{(Equation 33)}$$

where the ratio of $$\frac{\text{I\_i2}}{\text{I\_p2}}$$

can vary with input line voltage. For example, the ratio increases with decreasing input line voltage. As described in Equations 32 and 33, if the two current limits I_p1 and I_p2 are equal, the amount of energy delivered to the load in DCM mode is higher than the amount of energy delivered to the load in CCM mode at each cycle.

Figure 13:
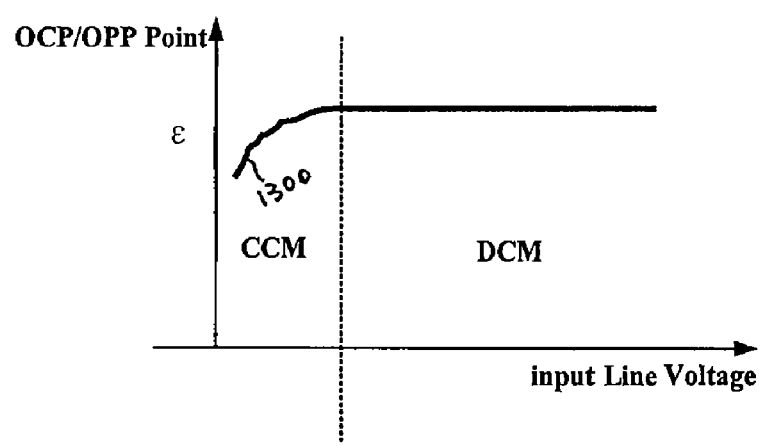
FIG. 13 shows a simplified diagram for maximum energy delivered to load at each cycle as a function of input line voltage.

FIG. 13 shows a simplified diagram for maximum energy delivered to load at each cycle as a function of input line voltage. As a function of input line voltage, the current limit, which equals either I_p1 or I_p2, is adjusted to compensate for "delay to output" as shown in FIG. 4, but differences between Equations 32 and 33 have not been taken into account. Also, FIG. 4 does not appear to have taken into account the varying ratio of $$\frac{I\_i2}{I\_p2}.$$

Hence the maximum energy is not constant over the entire range of line input voltage. For example, as shown by a curve 1300, the maximum energy decreases significantly with decreasing input line voltage in CCM mode, even though the maximum energy appears substantially constant in the DCM mode.

To achieve constant maximum energy over a wide range of input line voltage, the following should be satisfied based on Equations 32 and 33:

$$\frac{1}{2} \times L_p \times (I\_p1)^2 = \frac{1}{2} \times L_p \times [(I-p2)^2 - (I\_i2)^2] \quad \text{(Equation 34)}$$

Figure 14:
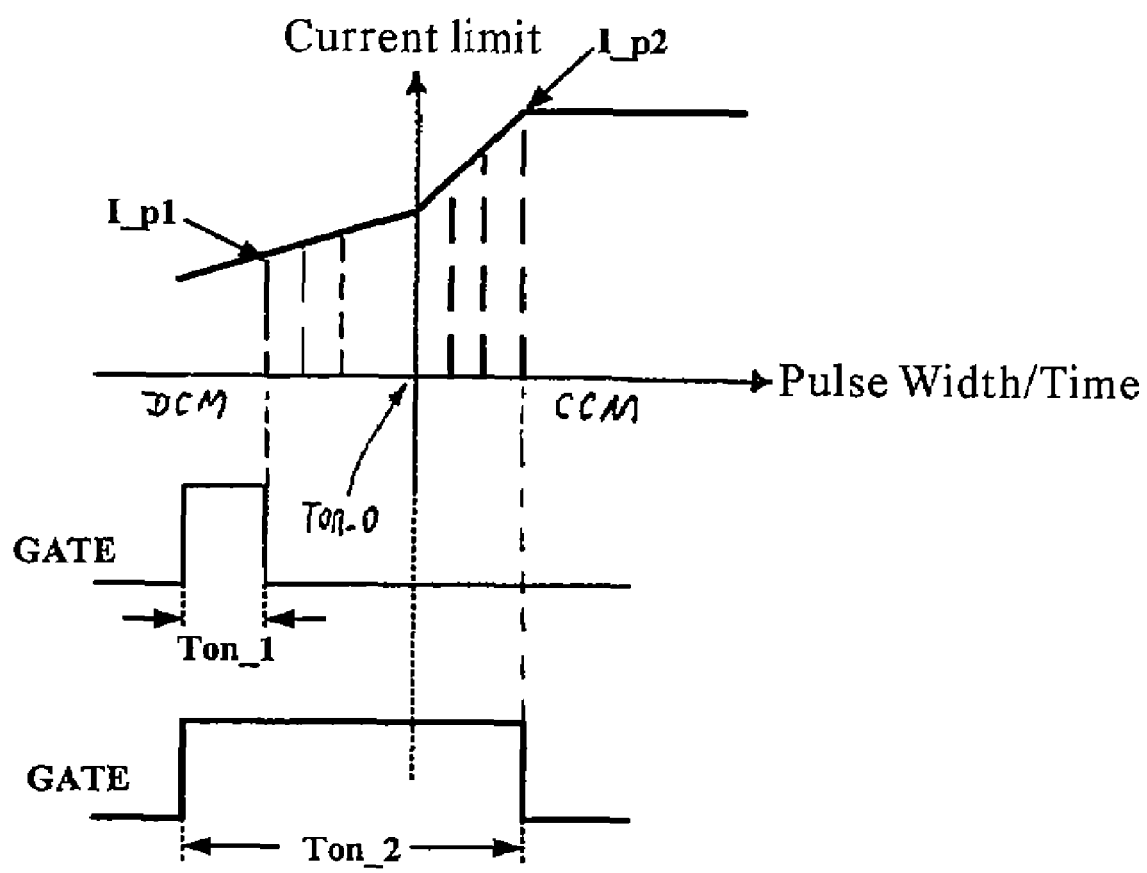
FIG. 14 is a simplified diagram showing relationship between current limit and PWM pulse width according to an embodiment of the present invention.

In practice, the power converter works in different modes and with different PWM pulse widths for a given load at different input line voltages. FIG. 14 is a simplified diagram showing relationship between current limit and PWM pulse width according to an embodiment of the present invention. The PWM pulse width is represented by a time period. FIG. 14 is merely an example, which should not unduly limit the scope of the claims. One of ordinary skill in the art would recognize many variations, alternatives, and modifications.

The current limit is represented by I_p1 in DCM mode and by I_p2 in CCM mode. For example, I_p1 has a linear relationship with pulse width according to a slope S_p1, and I_p2 has a linear relationship with pulse width according to a slope S_p2. In one embodiment, the slope S_p1 is smaller than the slope S_p2. In anther embodiment, I_p1 and I_p2 are equal at the pulse width Ton_0. For example, the pulse width Ton_0 represents a transition between DCM mode and CCM mode. In yet another embodiment, the pulse width reflects different values for input line voltage; hence the pulse width can be used to make the current limit depend on the input line voltage.

For example, at a high input line voltage, such as 264 volts in AC, the power converter works with narrow pulse width Ton_1 in the DCM mode to provide full power demanded by the load. As shown in FIG. 14, the primary winding current is limited to I_p1. Within each pulse width, the current for primary winding increases from I_L to the current limit I_p1. In another example, at a low input line voltage, such as 90 volts in AC, the power converter works with wide pulse width Ton_2 in the CCM mode to provide full power demanded by the load. As shown in FIG. 14, the primary winding current is limited to I_p2. Within each pulse width, the current for primary winding increases from I_i2 to the current limit I_p2.

FIGS. 15(A) and (B) are simplified diagrams showing relationship between over-current threshold voltage with pulse width and input line voltage respectively according to an embodiment of the present invention. For example, the over-current threshold voltage $V_{th\_OC}$ is used to control the peak current for the primary winding as shown in FIG. 1. FIGS. 15(A) and (B) are merely examples, which should not unduly limit the scope of the claims. One of ordinary skill in the art would recognize many variations, alternatives, and modifications.

As shown in FIG. 15(A), the over-current threshold voltage $V_{th\_OC}$ has different relationships with the PWM pulse width in different regions. In region I, the threshold voltage $V_{th\_OC}$ has a linear relationship with pulse width according to a slope S_1w; in region II, the threshold voltage $V_{th\_OC}$ has a linear relationship with pulse width according to a slope S_2w; and in region III, the threshold voltage $V_{th\_OC}$ has a linear relationship with pulse width according to a slope S_3w. For example, the slope S_2w is larger than the slope S_1w in magnitude, and the slope S_1w is larger than the slope S_3w in magnitude. In one embodiment, the slope S_3w is equal to zero. In another embodiment, the decreasing of the PWM pulse width corresponds to the increasing of the input line voltage for full power demanded by the load at a given switching frequency.

As shown in FIG. 15(B), the over-current threshold voltage $V_{th\_OC}$ has different relationships with input line voltage in different regions. In region I, the threshold voltage $V_{th\_OC}$ has a linear relationship with input line voltage according to a slope S_1v; in region II, the threshold voltage $V_{th\_OC}$ has a linear relationship with input line voltage according to a slope S_2v; and in region III, the threshold voltage $V_{th\_OC}$ has a linear relationship with input line voltage according to a slope S_3v. For example, the slope S_1v corresponds to the slope S_3w, the slope S_2v corresponds to the slope S_2w, and the slope S_3v corresponds to the slope S_1w. In another example, the slope S_2w is larger than the slope S_3w in magnitude, and the slope S_3w is larger than the slope S_1w in magnitude. In one embodiment, the slope S_1w is equal to zero. In another embodiment, the slope S_3w is equal to $$\frac{T_{delay}}{L_p}$$

as shown in FIG. 4.

According to one embodiment, in region I, the power converter works in the DCM mode for the power demand up to the full load at input line voltage in a relatively high range. The over-current threshold voltage $V_{th\_OC}$ increases with the decreasing input line voltage or the increasing PWM pulse width for given switching frequency in order to compensate for propagation delay, $T_{delay}$. According to another embodiment, in region II, the power converter works in the CCM mode for the power demand up to the full load at input line voltage in an intermediate range. The over-current threshold voltage $V_{th\_OC}$ increases with the decreasing input line voltage or the increasing PWM pulse width for given switching frequency in order to compensate for both CCM mode operation and propagation delay, $T_{delay}$. According to yet another embodiment, in region III, the power converter works in the CCM mode, but the over-current threshold voltage $V_{th\_OC}$ is limited to Vth_OC_2 for input line voltage in a relatively low range. For example, the limitation of Vth_OC_2 can protect the primary winding current from rising too high or prevent saturation of the power converter inductor.

Figure 16:
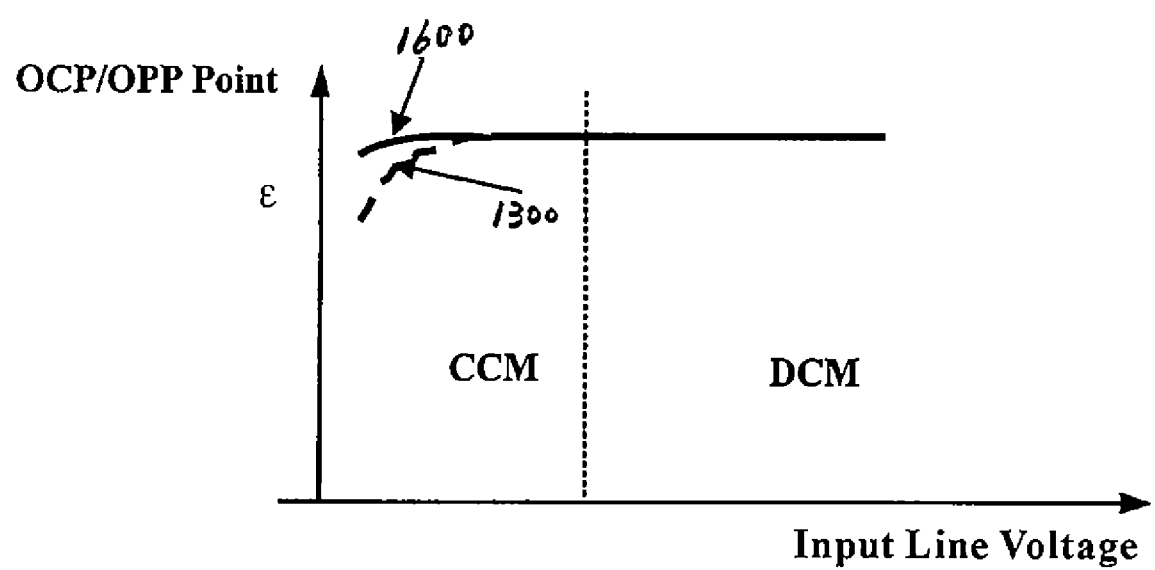
FIG. 16 shows a simplified diagram for maximum energy delivered to load at each cycle as a function of input line voltage according to certain embodiments of the present invention.
Figure 17:
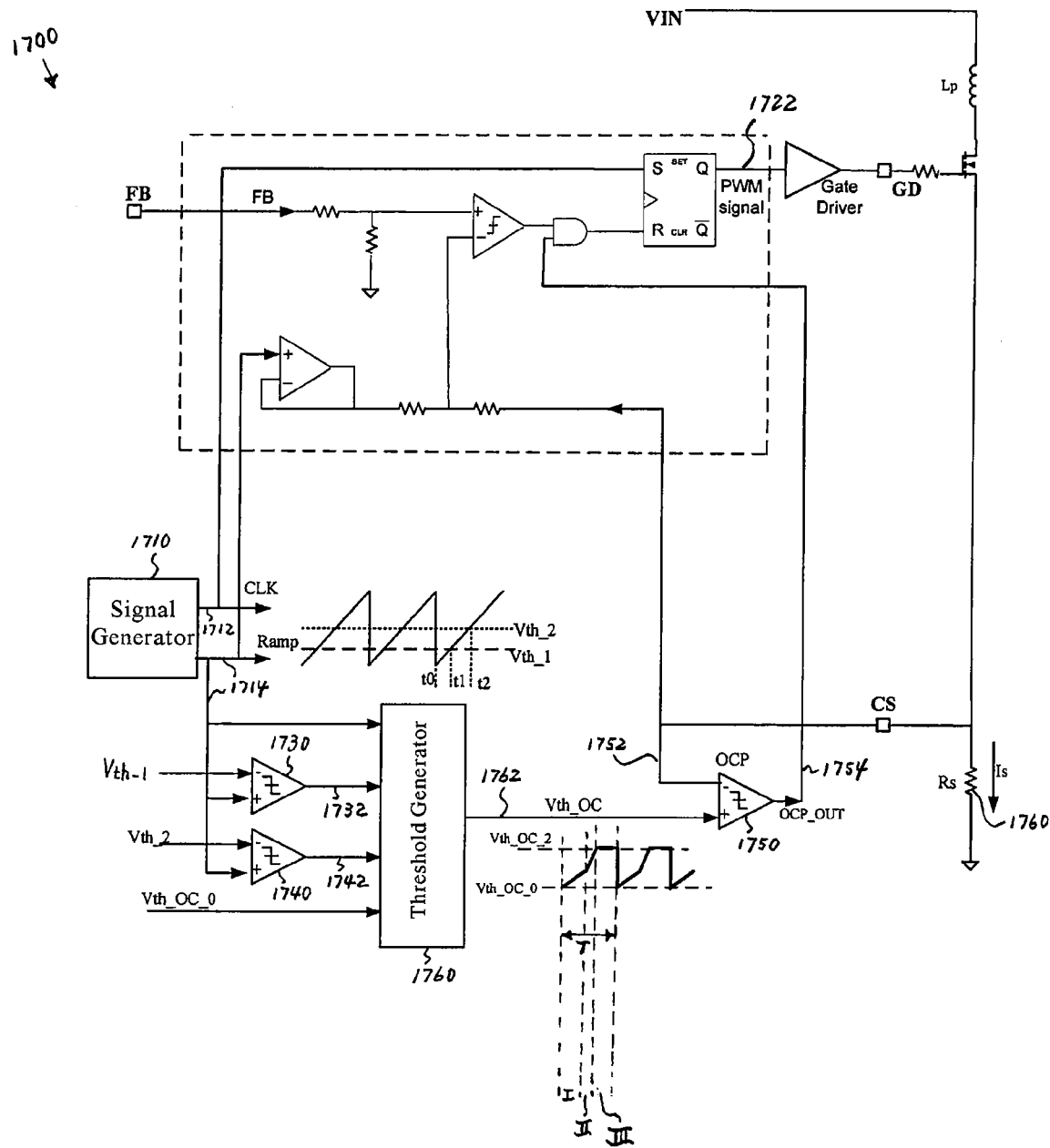
FIG. 17 is a simplified control system for over-current and over-power protection according to yet another embodiment of the present invention.
Figure 19:
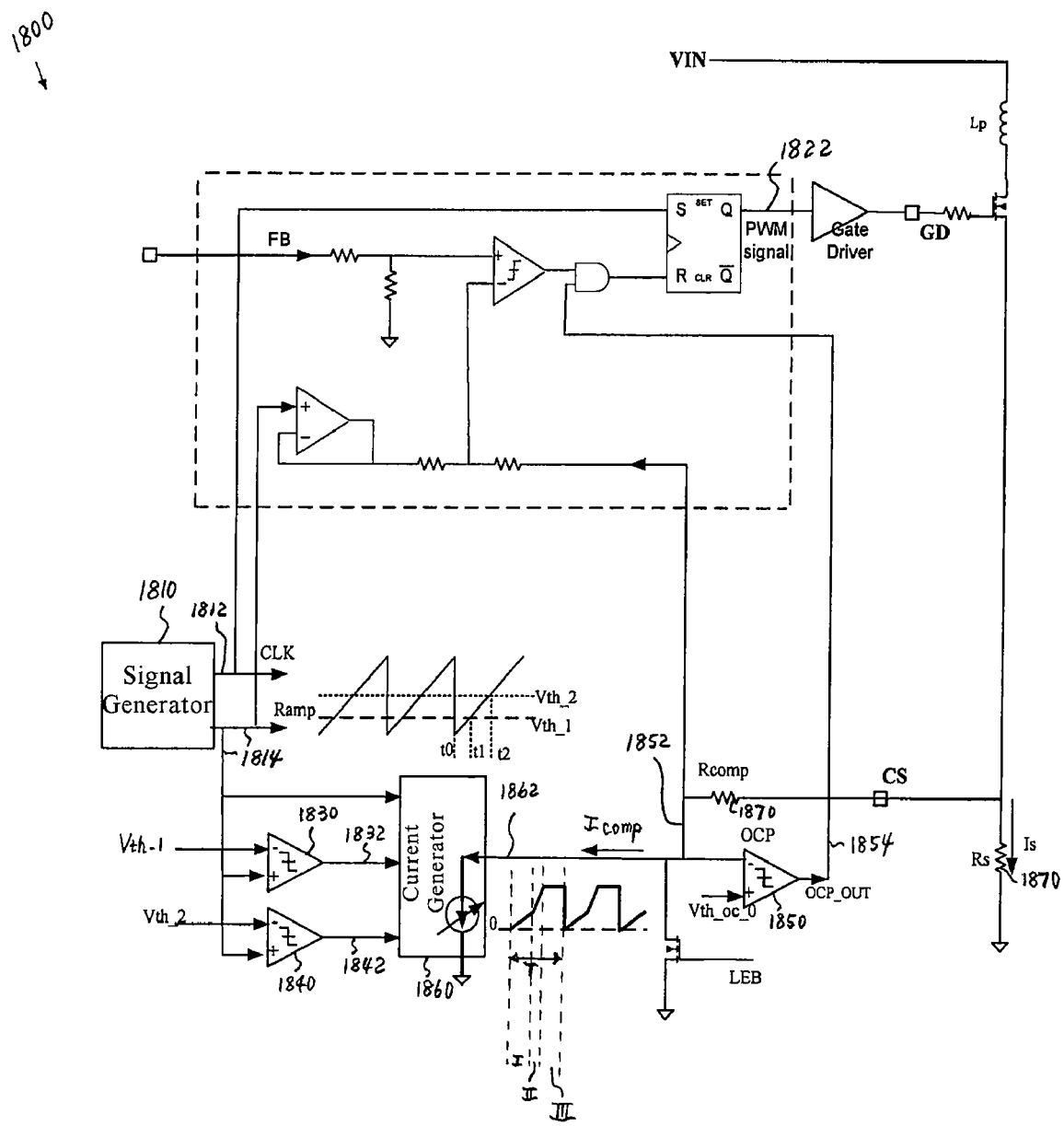
FIG. 19 is a simplified control system for over-current and over-power protection according to yet another embodiment of the present invention.

FIG. 16 shows a simplified diagram for maximum energy delivered to load at each cycle as a function of input line voltage according to certain embodiments of the present invention. As shown by a curve 1600, the maximum energy, for example, remains substantially flat with decreasing input line voltage in CCM mode. In comparison, the curve 1300 shows the maximum energy decreases significantly with decreasing input line voltage in CCM mode. In one embodiment, the curve 1600 describes the performance of the system as shown in FIG. 17. In another example, the curve 1600 describes the performance of the system as shown in FIG. 19.

FIG. 17 is a simplified control system for over-current and over-power protection according to yet another embodiment of the present invention. This diagram is merely an example, which should not unduly limit the scope of the claims. One of ordinary skill in the art would recognize many variations, alternatives, and modifications. A system 1700 includes a signal generator 1710, a pulse-width-modulation (PWM) generator 1720, comparators 1730, 1740, and 1750, and a threshold generator 1760. Although the above has been shown using a selected group of components for the system 1700, there can be many alternatives, modifications, and variations. For example, some of the components may be expanded and/or combined. Other components may be inserted to those noted above. Depending upon the embodiment, the arrangement of components may be interchanged with others replaced. For example, the system 1700 is used to regulate a power converter. Further details of these components are found throughout the present specification and more particularly below.

The signal generator 1710 generates a clock signal 1712 and a ramping signal 1714. For example, the clock signal 1712 is periodic, each period including an off period and an on period. The clock signal 1712 and the ramping signal 1714 are sent to the PWM generator 1720. For example, the signal generator 1710 is an oscillator. In another example, the ramping signal 1714 represents voltage level as a function of time. The PWM generator 1720 generates a PWM signal 1722. In one embodiment, the PWM signal 1722 is used to control a switch for current flowing through a primary winding of a voltage converter As shown in FIG. 17, the ramping signal 1714 is also received by the comparators 1730 and 1740. For example, the comparator 1730 compares the ramping signal 1714 and a reference voltage $V_{th\_1}$, and generates a comparison signal 1732. In another example, the comparator 1740 compares the ramping signal 1714 and a reference voltage $V_{th\_2}$, and generates a comparison signal 1742.

Figure 15:
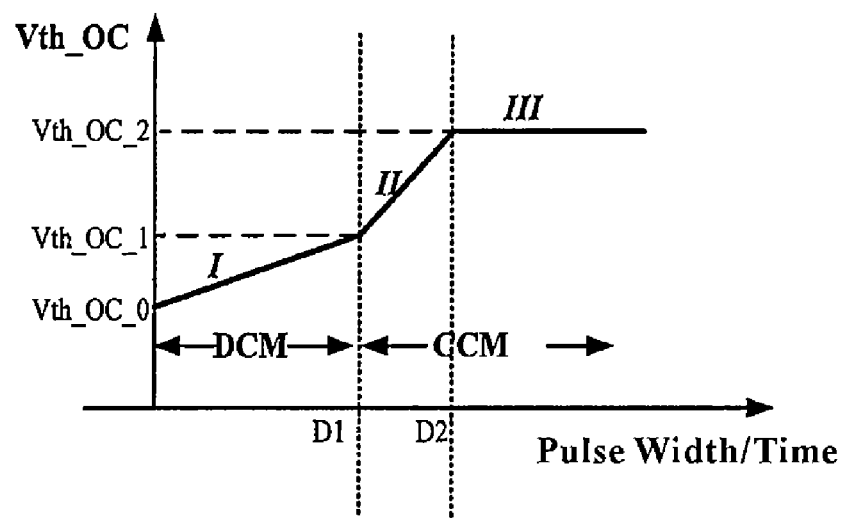
FIGS. 15(A) and (B) are simplified diagrams showing relationship between over-current threshold voltage with pulse width and input line voltage respectively according to an embodiment of the present invention.
Figure 15:
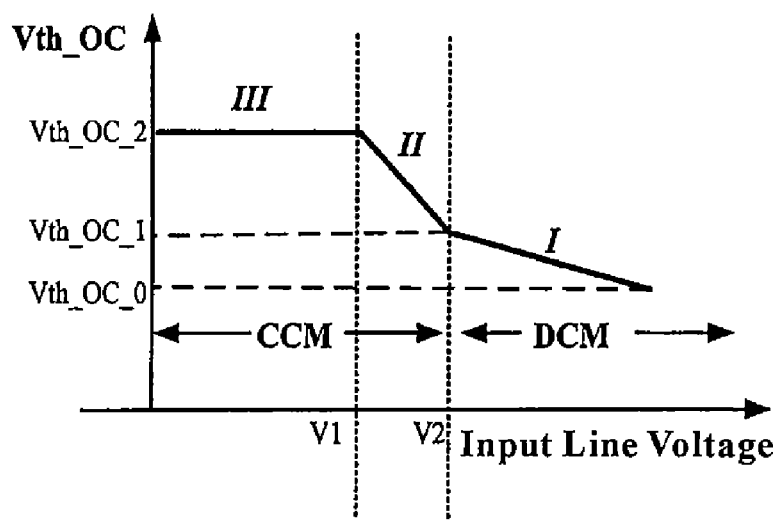

Both the comparison signals 1732 and 1742 are received by the threshold generator 1760. The threshold generator 1760 also receives the ramping signal 1714. Based on at least information associated with the comparison signals 1732 and 1742, and the ramping signal 1714, the threshold generator 1760 outputs a voltage signal 1762. For example, the voltage signal 1762 represents the over-current threshold voltage $V_{th\_OC}$ as a function of time. In another example, the voltage signal 1762 is a periodic signal with a period T. According to one embodiment, within each period, the voltage signal 1762 covers three regions I, II, and III, as shown in FIG. 15(A). According to another embodiment, within each period, the voltage signal 1762 can be used to determine the value of the threshold voltage $V_{th\_OC}$ for a given pulse width as shown in FIGS. 14 and 15. For example, different pulse widths correspond to different input line voltages at a give switching frequency for a given load.

The voltage signal 1762 is sent by the threshold generator 1760 to the comparator 1750, which also receives a current sensing signal 1752. In one embodiment, the current sensing signal 1752 is a ramping signal that represents a current-sensing voltage $V_{CS}$. For example, the current-sensing voltage $V_{CS}$ increases linearly with time according to a slope $$\frac{V_{in}}{L_p} R_s.$$

$R_s$ is the resistance for a resistor 1760, and $L_p$ is the inductance of the primary winding for the power converter. In another example, the current-sensing voltage $V_{CS}$ is determined by $$V_{CS} = I_{sense} \times R_s \qquad \text{(Equation 35)}$$

where $I_{sense}$ represents the current flowing through the primary winding.

The comparator 1750 compares the voltage signal 1762 and the current sensing signal 1752, and generates an output signal 1754. For example, at the beginning of each period T, the switch for the primary winding is closed, e.g., turned on. Then if $V_{CS}$ becomes equal to or larger than $V_{th\_OC}$, the output signal 1754 becomes logic low. As shown in FIG. 17, the output signal 1754 is received by the PWM generator 1720. If the output signal 1754 becomes logic low, the PWM signal turns off the switch for the current flowing through the primary winding according to an embodiment. Therefore, different peak currents for the primary winding can be achieved as a function of input line voltage and as a function of PWM pulse width.

Specifically, according to certain embodiments, the peak current for the primary winding is determined by $$I_{peak} = \frac{V_{th\_OC}}{R_s} \qquad \text{(Equation 36)}$$

For example, the threshold voltage $V_{th\_OC}$ is periodic with the period T and covers three regions I, II, and III within each period. For example, each period starts at $t_0$ and ends at $t_0+T$. Period I extends from $t_0$ to $t_1$, period II extends from $t_1$ to $t_2$, and period III extends from $t_2$ to $t_0+T$. In one embodiment, the over-current threshold voltage $V_{th\_OC}$ is determined by Region I: $V_{th\_OC} = V_{th\_OC\_0} + \beta_1 \times (t-t_0)\ t_0 \leq t \leq t_1$ (Equation 37A)

Region II: $V_{th\_OC} = V_{th\_OC\_0} + \beta_1 \times (t_1-t_0) + \beta_2 \times (t-t_1)\ t_1 \leq t \leq t_2$ (Equation 37B)

Region III: $V_{th\_OC} = V_{th\_OC\_0} + \beta_1 \times (t_1-t_0) + \beta_2 \times (t_2-t_1)\ t_2 \leq t \leq t_0+T$ (Equation 37C)

where $\beta_1$ and $\beta_2$ are the slopes. For example, as shown in FIG. 15(A), $\beta_1 = S\_1w$ (Equation 38A)

$\beta_2 = S\_2w$ (Equation 38B)

As discussed above and further emphasized here, FIG. 17 is merely an example, which should not unduly limit the scope of the claims. One of ordinary skill in the art would recognize many variations, alternatives, and modifications. For example, the comparator 1750 includes two or more comparators. In another example, the comparator 1750 also includes one or more logic component, such as an AND gate.

Figure 18:
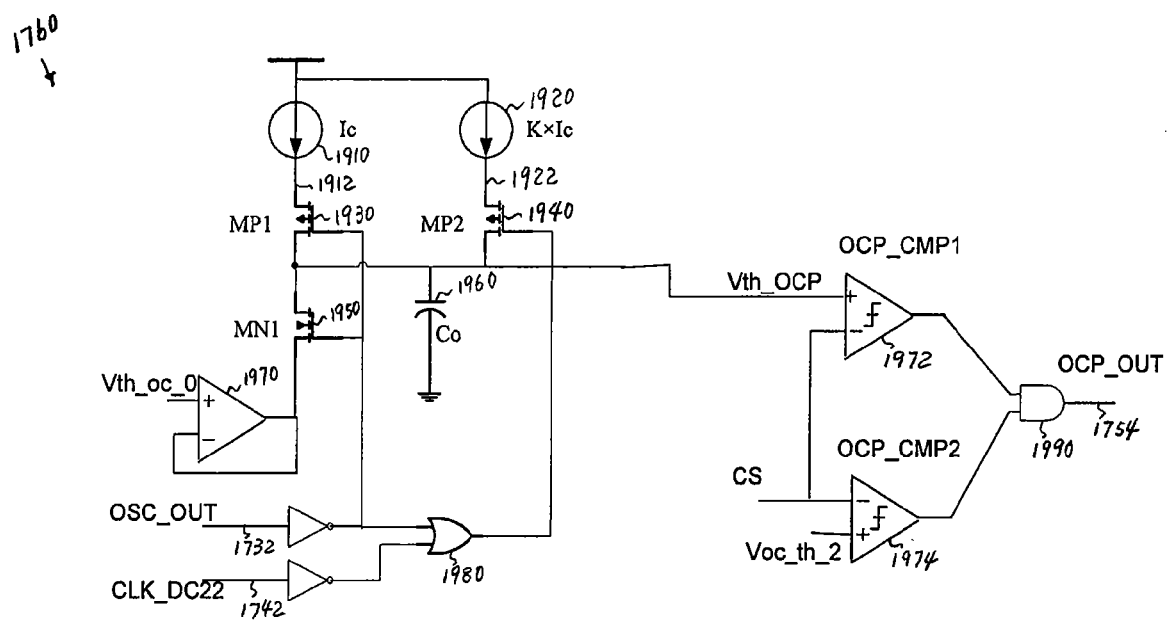
FIG. 18 is a simplified diagram showing the threshold generator and the comparator in the control system for over-current and over-power protection according to an embodiment of the present invention.

FIG. 18 is a simplified diagram showing the threshold generator 1760 and the comparator 1750 in the control system 1700 for over-current and over-power protection according to an embodiment of the present invention. This diagram is merely an example, which should not unduly limit the scope of the claims. One of ordinary skill in the art would recognize many variations, alternatives, and modifications. The threshold generator 1760 includes current sources 1910 and 1920, transistors 1930, 1940, and 1950, a capacitor 1960, comparators 1970, 1972, and 1974, an OR gate 1980, and an AND gate 1990. Although the above has been shown using a selected group of components for the threshold generator 1760, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

During the off period of the clock signal 1712, the transistor 1950 is turned on, and the transistors 1930 and 1940 are turned off. For example, the transistor 1950 is the NMOS transistor MN1, and the transistors 1930 and 1940 are PMOS transistors MP1 and MP2 respectively. As a result, the voltage across the capacitor 1960 is $V_{th\_oc\_0}$.

During the on period of the clock signal 1712, the transistor 1950 is turned off. Between $t_0$ and $t_1$, the signal 1732 is at logic high, and the signal 1742 is at logic low. As a result, the transistor 1930 is turned on but the transistor 1940 remains off. As shown in FIG. 18, the capacitor 1960 is charged by a current 1912 generated by the current source 1910. In one embodiment, the current 1912 is equal to $I_c$, and the capacitance of the capacitor 1960 is equal to $C_0$. The voltage across the capacitor 1960 ramps up at the slop of $$\beta_1 = \frac{I_c}{C_o}$$

as shown in Equation 37A. The voltage across the capacitor 1960 is the threshold voltage for the comparator 1972. In one embodiment, the comparator 1972 compares the threshold voltage and the current sensing signal 1752, and generates a comparison signal. If $V_{CS}$ becomes equal to or larger than the threshold voltage, the output signal 1754 becomes logic low. If the output signal 1754 becomes logic low, the PWM signal turns off the switch for the current flowing through the primary winding according to an embodiment.

Between $t_1$ and $t_2$ during the on period of the clock signal 1712, both signals 1732 and 1742 are at logic high. Thus, the transistors 1930 and 1940 are turned on. The capacitor 1960 is charged with the current 1912 and another current 1922 that is generated by the current source 1920. In one embodiment, the current 1912 is equal to $I_c$, and the current 1922 is equal to $k \times I_c$. The voltage across the capacitor 1960 ramps up at the slope of $$\beta_2 = \frac{(K+1) \times I_c}{C_o}$$

as shown in Equation 37B. The voltage across the capacitor 1960 is the threshold voltage for the comparator 1972. In one embodiment, the comparator 1972 compares the threshold voltage and the current sensing signal 1752, and generates a comparison signal. If $V_{CS}$ becomes equal to or larger than the threshold voltage, the output signal 1754 becomes logic low. If the output signal 1754 becomes logic low, the PWM signal turns off the switch for the current flowing through the primary winding according to an embodiment. After $t_2$, whenever $V_{CS}$ becomes equal to or larger than $V_{th\_oc\_2}$, the output of the comparator 1974 becomes logic low. As a result, the signal 1754 is at logic low regardless of the output of the comparator 1972. Hence, for certain embodiments, the over-current threshold voltage $V_{th\_OC}$ saturates at $V_{th\_oc\_2}$ as shown in FIG. 15(A).

FIG. 19 is a simplified control system for over-current and over-power protection according to yet another embodiment of the present invention. This diagram is merely an example, which should not unduly limit the scope of the claims. One of ordinary skill in the art would recognize many variations, alternatives, and modifications. A system 1800 includes a signal generator 1810, a pulse-width-modulation (PWM) generator 1820, comparators 1830, 1840, and 1850, a current generator 1860, and a resistor 1870. Although the above has been shown using a selected group of components for the system 1800, there can be many alternatives, modifications, and variations. For example, some of the components may be expanded and/or combined. Other components may be inserted to those noted above. Depending upon the embodiment, the arrangement of components may be interchanged with others replaced. For example, the system 1800 is used to regulate a power converter. Further details of these components are found throughout the present specification and more particularly below.

The signal generator 1810 generates a clock signal 1812 and a ramping signal 1814. The clock signal 1812 and the ramping signal 1814 are sent to the PWM generator 1820. For example, the signal generator 1810 is an oscillator. In another example, the ramping signal 1814 represents voltage level as a function of time. The PWM generator 1820 generates a PWM signal 1822. In one embodiment, the PWM signal 1822 is used to control a switch for current flowing through a primary winding of a voltage converter.

As shown in FIG. 19, the ramping signal 1814 is also received by the comparators 1830 and 1840. For example, the comparator 1830 compares the ramping signal 1814 and a reference voltage $V_{th\_1}$, and generates a comparison signal 1832. In another example, the comparator 1840 compares the ramping signal 1814 and a reference voltage $V_{th\_2}$, and generates a comparison signal 1842.

Both the comparison signals 1832 and 1842 are received by the current generator 1860. The current generator 1860 also receives the ramping signal 1814. Based on at least information associated with the comparison signals 1832 and 1842, and the ramping signal 1814, the current generator 1860 generates a current 1862. For example, the current 1862 flows into the current generator 1860. In another example, the current generator 1860 is a current sink. In yet another example, the current 1862 has a magnitude $I_{comp}$ that varies as a function of time. In one embodiment, the magnitude $I_{comp}$ is periodic with a period T.

As shown in FIG. 19, the current generator 1860 is coupled to a predetermined voltage and the resistor 1870. In one embodiment, the predetermined voltage is the ground voltage. In another embodiment, the resistor 1870 has a resistance value $R_{comp}$. The current 1862 flowing through the resistor 1870 generates a compensation voltage $V_{comp}$. The compensation voltage $V_{comp}$ is superimposed with a current-sensing voltage $V_{CS}$, thus generating a total voltage $V_{total}$. For example, the current-sensing voltage $V_{CS}$ increases linearly with time according to a slope $$\frac{V_{in}}{L_p} R_s.$$

$R_s$ is the resistance for a resistor 1870, and $L_p$ is the inductance of the primary winding for the power converter. In another example, the current-sensing voltage $V_{CS}$ is determined by $R_s$ and $I_{sense}$ based on Equation 35, where $I_{sense}$ represents the current flowing through the primary winding.

According to an embodiment, the total voltage $V_{total}$ is equal to:

$$V_{total} = V_{cs} - V_{comp} = V_{cs} - I_{comp} \times R_{comp} = I_{sense} \times R_s - I_{comp} \times R_{comp} \quad \text{(Equation 39)}$$

The total voltage $V_{total}$ is received by the comparator 1850, which also receives a threshold voltage $V_{th\_OC\_0}$. The comparator 1850 compares the total voltage $V_{total}$ and the threshold voltage $V_{th\_OC\_0}$, and generates an output signal 1854. For example, at the beginning of each period T, the switch for the primary winding is closed, e.g., turned on. Then if $V_{total}$ becomes equal to or larger than $V_{th\_OC\_0}$, the output signal 1854 becomes logic low. As shown in FIG. 19, the output signal 1854 is received by the PWM generator 1820. If the output signal 1854 becomes logic low, the PWM signal would turn off the switch for the current flowing through the primary winding according to an embodiment. Therefore, different peak current for the primary winding can be achieved as a function of input line voltage and as a function of PWM pulse width.

$$I_{peak} = \frac{V_{th\_OC\_0} + I_{comp} \times R_{comp}}{R_s} \quad \text{(Equation 40)}$$

Hence the effective threshold voltage $V_{th\_OC\_eff}$ is $$V_{th\_OC\_eff} = V_{th\_OC\_0} + I_{comp} \times R_{comp} \quad \text{(Equation 41)}$$

According to one embodiment, within each period, the effective threshold voltage $V_{th\_OC\_eff}$ covers three regions I, II, and III, as shown in FIG. 15(A). According to another embodiment, within each period, Equation 41 can be used to determine the value of the effective threshold voltage $V_{th\_OC\_eff}$ for a given pulse width as shown in FIGS. 14 and 15. For example, different pulse widths correspond to different input line voltages at a give switching frequency for a given load.

As a result of Equation 41, $I_{comp}$ can be, for example, determined by $$I_{comp} = \frac{V_{th\_OC\_eff} - V_{th\_OC\_0}}{R_{comp}} \quad \text{(Equation 42)}$$

According to certain embodiments, the current magnitude $I_{comp}$ is periodic with the period T and covers three regions I, II, and III within each period. For example, each period starts at $t_0$ and ends at $t_0+T$. Period I extends from $t_0$ to $t_1$, period II extends from $t_1$ to $t_2$, and period III extends from $t_2$ to $t_0+T$. In one embodiment, the current magnitude $I_{comp}$ is determined by $$\text{Region } I: \quad I_{comp} = \frac{\beta_3 \times (t - t_0)}{R_{comp}} \quad \text{(Equation 43A)}$$
$$t_0 \leq t \leq t_1$$

$$\text{Region } II: \quad I_{comp} = \frac{\beta_3 \times (t_1 - t_0) + \beta_4 \times (t - t_1)}{R_{comp}} \quad \text{(Equation 43B)}$$
$$t_1 \leq t \leq t_2$$

$$\text{Region } III: \quad I_{comp} = \frac{\beta_3 \times (t_1 - t_0) + \beta_4 \times (t_2 - t_1)}{R_{comp}} \quad \text{(Equation 43C)}$$
$$t_2 \leq t \leq t_0 + T$$

where $\beta_3$ and $\beta_4$ are the slopes. For example, as shown in FIG. 15(A), $$\beta_3 = S\_1w \quad \text{(Equation 44A)}$$

$$\beta_4 = S\_2w \quad \text{(Equation 44B)}$$

According to yet another embodiment, a system for protecting a power converter includes a threshold generator configured to generate a threshold signal, and a first comparator configured to receive the threshold signal and a first signal and to generate a comparison signal. The first signal is associated with an input current for a power converter. Additionally, the system includes a pulse-width-modulation generator configured to receive the comparison signal and generate a modulation signal in response to the comparison signal, and a switch configured to receive the modulation signal and adjust the input current for the power converter. The threshold signal is associated with a threshold magnitude as a function of time. The threshold magnitude increases with time at a first slope during a first period, and the threshold magnitude increases with time at a second slope during a second period. The first slope and the second slope are different. For example, the system is implemented according to FIG. 17.

According to yet another embodiment, a system for protecting a power converter includes a threshold generator configured to generate a first threshold signal, and a first comparator configured to receive the first threshold signal and a first input signal and to generate a first comparison signal. The first input signal is associated with an input current for a power converter, and the first threshold signal is associated with a first threshold magnitude as a function of time. Additionally, the system includes a second comparator configured to receive a second threshold signal and the first input signal and to generate a second comparison signal. The second threshold signal is associated with a second threshold magnitude. Moreover, the system includes a logic component configured to receive the first comparison signal and the second comparison signal and generate an output signal. Also, the system includes a pulse-width-modulation generator configured to receive the output signal and to generate a modulation signal in response to the output signal, and a switch configured to receive the modulation signal and adjust the input current for the power converter. The first threshold magnitude increases with time at a first slope during a first period, and the first threshold magnitude increases with time at a second slope during at least a second period. The first slope and the second slope are different. For example, the system is implemented according to FIGS. 17 and/or 18.

According to yet another embodiment, a system for protecting a power converter includes a current generator configured to generate a first current flowing into the current generator, and a comparator configured to receive a threshold signal and a first signal and to generate a comparison signal. The first signal is a sum of a second signal and a third signal, the second signal is associated with the first current, and the third signal is associated with an input current for a power converter. Additionally, the system includes a pulse-width-modulation generator configured to receive the comparison signal and generate a modulation signal in response to the comparison signal, and a switch configured to receive the modulation signal and adjust the input current for the power converter. The first current is associated with a current magnitude as a function of time. The current magnitude increases with time at a first slope during a first period, and the threshold magnitude increases with time at a second slope during a second period. The first slope and the second slope are different. For example, the system is implemented according to FIG. 19.

According to yet another embodiment, a method for protecting a power converter includes generating a threshold signal, and receiving the threshold signal and a first signal. The first signal is associated with an input current for a power converter. Additionally, the method includes processing information associated with the threshold signal and the first signal, generating a comparison signal based on at least information associated with the threshold signal and the first signal, processing information associated with the comparison signal, generating a modulation signal based on at least information associate with the comparison signal, and adjusting the input current for the power converter in response to the modulation signal. The threshold signal is associated with a threshold magnitude as a function of time. The threshold magnitude increases with time at a first slope during a first period, and the threshold magnitude increases with time at a second slope during a second period. The first slope and the second slope are different. For example, the method is performed according to FIG. 17.

According to yet another embodiment, a method for protecting a power converter includes generating a first threshold signal. The first threshold signal is associated with a first threshold magnitude as a function of time. Additionally, the method includes receiving the first threshold signal and a first input signal. The first input signal is associated with an input current for a power converter. Moreover, the method includes processing information associated with the first threshold signal and the first input signal, generating a first comparison signal based on at least information associated with the first threshold signal and the first input signal, and receiving a second threshold signal and the first input signal. The second threshold signal is associated with a second threshold magnitude. Also, the method includes processing information associated with the second threshold signal and the first input signal, generating a second comparison signal based on at least information associated with the second threshold signal and the first input signal, receiving the first comparison signal and the second comparison signal, and generating an output signal based on at least information associated with the first comparison signal and the second comparison signal. Additionally, the method includes processing information associated with the output signal, generating a modulation signal based on at least information associated with the output signal, and adjust the input current for the power converter in response to the modulation signal. The first threshold magnitude increases with time at a first slope during a first period, the first threshold magnitude increases with time at a second slope during at least a second period, and the first slope and the second slope are different. For example, the method is performed according to FIGS. 17 and/or 18.

According to yet another embodiment, a method for protecting a power converter includes generating a first current flowing into a current generator, and receiving a threshold signal and a first signal. The first signal is a sum of a second signal and a third signal, the second signal is associated with the first current, and the third signal is associated with an input current for a power converter. Additionally, the method includes processing information associated with the threshold signal and the first signal, generating a comparison signal based on at least information associated with the threshold signal and the first signal, processing information associated with the comparison signal, generating a modulation signal based on at least information associated with the comparison signal, and adjusting the input current for the power converter in response to the modulation signal. The first current is associated with a current magnitude as a function of time. The current magnitude increases with time at a first slope during a first period, and the threshold magnitude increases with time at a second slope during a second period. The first slope and the second slope are different. For example, the method is performed according to FIG. 19.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for protecting a power converter, the system comprising:
   a threshold generator configured to generate a threshold signal;
   a first comparator configured to receive the threshold signal and a first signal and to generate a comparison signal, the first signal being associated with an input current for a power converter;
   a pulse-width-modulation generator configured to receive the comparison signal and generate a modulation signal in response to the comparison signal; and
   a switch configured to receive the modulation signal and adjust the input current for the power converter;
   wherein:
   the threshold signal is associated with a threshold magnitude as a function of time;
   the threshold magnitude increases with time at a first slope during a first substantial period of time;
   the threshold magnitude increases with time at a second slope during a second substantial period of time; and
   the first slope and the second slope are different.

2. The system of claim 1 wherein the threshold magnitude is periodic with a threshold period, the threshold period including at least the first substantial period of time and the second substantial period of time.

3. The system of claim 2 wherein the threshold period further includes a third period.

4. The system of claim 3 wherein:
   the threshold magnitude increases from a first threshold value to a second threshold value during the first substantial period of time;
   the threshold magnitude increases from the second threshold value to a third threshold value during the second substantial period of time; and
   the threshold magnitude remains constant during the third period.

5. The system of claim 1 wherein:
   the power converter includes an inductive winding; and
   the input current flows through the inductive winding.

6. The system of claim 1, and further comprising a first resistor configured to convert the input current for the power converter to a first voltage, the first voltage represented by the first signal.

7. The system of claim 6 wherein the threshold signal represents a threshold voltage.

8. The system of claim 1 wherein the modulation signal turns off the switch if the comparison signal indicates a first amplitude for the first signal is equal to or larger than the threshold amplitude.

9. The system of claim 1 wherein the pulse-width-modulation generator comprises a pulse-width-modulation comparator, a logic controller, and a gate driver.

10. The system of claim 9 wherein:
    the logic controller is configured to receive the comparison signal and generate a control signal; and
    the gate driver is configured to receive the control signal and generate the modulation signal.

11. A system for protecting a power converter, the system comprising:
    a threshold generator configured to generate a first threshold signal;
    a first comparator configured to receive the first threshold signal and a first input signal and to generate a first comparison signal, the first input signal being associated with an input current for a power converter, the first threshold signal being associated with a first threshold magnitude as a function of time;

a second comparator configured to receive a second threshold signal and the first input signal and to generate a second comparison signal, the second threshold signal being associated with a second threshold magnitude;

a logic component configured to receive the first comparison signal and the second comparison signal and generate an output signal;

a pulse-width-modulation generator configured to receive the output signal and to generate a modulation signal in response to the output signal; and a switch configured to receive the modulation signal and adjust the input current for the power converter;

wherein:
the first threshold magnitude increases with time at a first slope during a first substantial period of time;
the first threshold magnitude increases with time at a second slope during at least a second substantial period of time; and
the first slope and the second slope are different.

12. The system of claim 11 wherein the second threshold magnitude is constant.

13. The system of claim 11 wherein the first threshold magnitude is periodic with a threshold period, the threshold period including at least the first substantial period of time and the second substantial period of time.

14. The system of claim 11 wherein:
the power converter includes an inductive winding; and
the input current flows through the inductive winding.

15. The system of claim 11, and further comprising a first resistor configured to convert the input current for the power converter to a first voltage, the first voltage represented by the first input signal.

16. The system of claim 15 wherein:
the first threshold signal represents a first threshold voltage; and
the second threshold signal represents a second threshold voltage.

17. The system of claim 11 wherein the logic component is an AND gate.

18. The system of claim 17 wherein:
the modulation signal turns off the switch if a first input amplitude for the first input signal is equal to or larger than an effective threshold amplitude;
the effective threshold amplitude is equal to the first threshold magnitude if the first threshold magnitude is equal to or smaller than the second threshold magnitude; and
the effective threshold amplitude is equal to the second threshold magnitude if the first threshold magnitude is higher than the second threshold magnitude.

19. A system for protecting a power converter, the system comprising:
a current generator configured to generate a first current flowing into the current generator;
a comparator configured to receive a threshold signal and a first signal and to generate a comparison signal, the first signal being a sum of a second signal and a third signal, the second signal being associated with the first current, the third signal being associated with an input current for a power converter;
a pulse-width-modulation generator configured to receive the comparison signal and generate a modulation signal in response to the comparison signal; and
a switch configured to receive the modulation signal and adjust the input current for the power converter;

wherein:
the first current is associated with a current magnitude as a function of time;
the current magnitude increases with time at a first slope during a first substantial period of time;
the current magnitude increases with time at a second slope during a second substantial period of time; and
the first slope and the second slope are different.

20. The system of claim 19 wherein the threshold signal is associated with a threshold magnitude, the threshold magnitude being constant.

21. The system of claim 19 wherein the current magnitude is periodic with a magnitude period, the magnitude period including at least the first substantial period of time and the second substantial period of time.

22. The system of claim 21 wherein the magnitude period further includes a third period.

23. The system of claim 22 wherein:
the current magnitude increases from a first current value to a second current value during the first substantial period of time;
the current magnitude increases from the second current value to a third current value during the second substantial period of time; and
the current magnitude remains constant during the third period.

24. The system of claim 19 wherein:
the power converter includes an inductive winding; and
the input current flows through the inductive winding.

25. The system of claim 19, and further comprising:
a first resistor configured to convert the first current to a first voltage, the first voltage represented by the second signal; and
a second resistor configured to convert the input current for the power converter to a second voltage, the second voltage represented by the third signal.

26. The system of claim 25 wherein the threshold signal represents a threshold voltage.

27. The system of claim 19 wherein the modulation signal turns off the switch if the comparison signal indicates a first amplitude for the first signal is equal to or larger than a threshold amplitude for the threshold signal.

28. The system of claim 19 wherein the pulse-width-modulation generator comprises a pulse-width-modulation comparator, a logic controller, and a gate driver.

29. The system of claim 28 wherein:
the logic controller is configured to receive the comparison signal and generate a control signal; and
the gate driver is configured to receive the control signal and generate the modulation signal.

30. A method for protecting a power converter, the method comprising:
generating a threshold signal;
receiving the threshold signal and a first signal, the first signal being associated with an input current for a power converter;
processing information associated with the threshold signal and the first signal;
generating a comparison signal based on at least information associated with the threshold signal and the first signal;
processing information associated with the comparison signal;
generating a modulation signal based on at least information associate with the comparison signal; and adjusting the input current for the power converter in response to the modulation signal;
wherein:
the threshold signal is associated with a threshold magnitude as a function of time;
the threshold magnitude increases with time at a first slope during a first substantial period of time;
the threshold magnitude increases with time at a second slope during a second substantial period of time; and
the first slope and the second slope are different.

31. A method for protecting a power converter, the method comprising:
generating a first threshold signal, the first threshold signal being associated with a first threshold magnitude as a function of time;
receiving the first threshold signal and a first input signal, the first input signal being associated with an input current for a power converter;
processing information associated with the first threshold signal and the first input signal;
generating a first comparison signal based on at least information associated with the first threshold signal and the first input signal;
receiving a second threshold signal and the first input signal, the second threshold signal being associated with a second threshold magnitude;
processing information associated with the second threshold signal and the first input signal;
generating a second comparison signal based on at least information associated with the second threshold signal and the first input signal;
receiving the first comparison signal and the second comparison signal;
generating an output signal based on at least information associated with the first comparison signal and the second comparison signal;
processing information associated with the output signal;
generating a modulation signal based on at least information associated with the output signal; and
adjust the input current for the power converter in response to the modulation signal;
wherein:
the first threshold magnitude increases with time at a first slope during a first substantial period of time;
the first threshold magnitude increases with time at a second slope during at least a second substantial period of time; and
the first slope and the second slope are different.

32. A method for protecting a power converter, the method comprising:
generating a first current flowing into a current generator;
receiving a threshold signal and a first signal, the first signal being a sum of a second signal and a third signal, the second signal being associated with the first current, the third signal being associated with an input current for a power converter;
processing information associated with the threshold signal and the first signal;
generating a comparison signal based on at least information associated with the threshold signal and the first signal;
processing information associated with the comparison signal;
generating a modulation signal based on at least information associated with the comparison signal; and
adjusting the input current for the power converter in response to the modulation signal;
wherein:
the first current is associated with a current magnitude as a function of time;
the current magnitude increases with time at a first slope during a first substantial period of time;
the current magnitude increases with time at a second slope during a second substantial period of time; and
the first slope and the second slope are different.

* * * * *